(12) United States Patent
Naven et al.

(10) Patent No.: US 10,007,630 B2
(45) Date of Patent: *Jun. 26, 2018

(54) ENCAPSULATION ENABLED PCIE VIRTUALISATION

(71) Applicant: MICRON TECHNOLOGY, INC., Boise, ID (US)

(72) Inventors: Finbar Naven, Cheadle Hulme (GB); Marek Piekarski, Macclesfield (GB)

(73) Assignee: Micron Technology, Inc, Boise, ID (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/064,512

(22) Filed: Mar. 8, 2016

(65) Prior Publication Data
US 2016/0188517 A1    Jun. 30, 2016

Related U.S. Application Data

(63) Continuation of application No. 13/923,202, filed on Jun. 20, 2013, now Pat. No. 9,319,349.

(51) Int. Cl.
*G06F 13/40* (2006.01)
*H04L 29/06* (2006.01)
(Continued)

(52) U.S. Cl.
CPC ...... *G06F 13/4022* (2013.01); *G06F 13/4282* (2013.01); *H04L 49/30* (2013.01);
(Continued)

(58) Field of Classification Search
CPC ............ G06F 13/4022; G06F 13/4282; H04L 45/127; H04L 49/30; H04L 49/3009; H04L 69/22
(Continued)

(56) References Cited

U.S. PATENT DOCUMENTS 4,701,906 A    10/1987    Ransom et al.
7,752,376 B1    7/2010    Johnsen et al.
(Continued)

FOREIGN PATENT DOCUMENTS

GB    2473675 A    3/2011

OTHER PUBLICATIONS

JP office action dated Jul. 19, 2016 for JP application No. JP 2014-533980.
(Continued)

*Primary Examiner* — Un C Cho
*Assistant Examiner* — Shah Rahman
(74) *Attorney, Agent, or Firm* — Dorsey & Whitney LLP

(57) ABSTRACT

A method for transmitting data packets from a first device through a switch to a second device is described. The method is performed at an intercepting device intermediate the first device and the switch device. The method comprises receiving a first data packet from the first device, determining that the first data packet is to be transmitted to the second device and determining whether the first data packet is of a first type that can not be transmitted from the intercepting device to the second device through the switch. If the first data packet is of the first type, the first data packet is encapsulated within a second data packet and transmitting the second data packet through the switch to the second device. If the first data packet is not of the first type, the method comprises transmitting the first data packet through the switch to the second device.

16 Claims, 15 Drawing Sheets

(51) Int. Cl.
*G06F 13/42* (2006.01)
*H04L 12/721* (2013.01)
*H04L 12/935* (2013.01)
*G06F 13/10* (2006.01)

(52) U.S. Cl.
CPC ............ *H04L 69/22* (2013.01); *G06F 13/107* (2013.01); *H04L 45/127* (2013.01); *H04L 49/3009* (2013.01)

(58) Field of Classification Search
USPC .......................................... 370/389; 710/316
See application file for complete search history.

(56) References Cited

U.S. PATENT DOCUMENTS

| | | | |
|---|---|---|---|
| 7,873,880 B2 | 1/2011 | Arataki et al. | |
| 7,979,592 B1* | 7/2011 | Pettey | G06F 13/404 |
| | | | 709/205 |
| 8,281,203 B2 | 10/2012 | Murakami et al. | |
| 9,146,890 B1* | 9/2015 | Brown | G06F 13/4022 |
| 2005/0102437 A1 | 5/2005 | Pettey et al. | |
| 2005/0246460 A1 | 11/2005 | Stufflebeam, Jr. | |
| 2006/0242333 A1 | 10/2006 | Johnsen et al. | |
| 2006/0242352 A1 | 10/2006 | Torudbakken et al. | |
| 2006/0242353 A1* | 10/2006 | Torudbakken | G06F 13/4022 |
| | | | 710/316 |
| 2007/0073911 A1 | 3/2007 | Eguchi et al. | |
| 2007/0147359 A1 | 6/2007 | Congdon et al. | |
| 2009/0150563 A1 | 6/2009 | Piekarski | |
| 2009/0154469 A1 | 6/2009 | Winter | |
| 2009/0268738 A1 | 10/2009 | Tchapda | |
| 2010/0161870 A1* | 6/2010 | Daniel | G06F 13/385 |
| | | | 710/314 |
| 2010/0250807 A1 | 9/2010 | Miyoshi | |
| 2011/0029734 A1* | 2/2011 | Pope | G06F 13/385 |
| | | | 711/118 |
| 2011/0069710 A1 | 3/2011 | Naven et al. | |
| 2012/0036306 A1* | 2/2012 | Miyoshi | G06F 13/102 |
| | | | 710/316 |
| 2013/0205053 A1* | 8/2013 | Harriman | G06F 13/4022 |
| | | | 710/105 |
| 2014/0016648 A1* | 1/2014 | Hidaka | H04L 49/15 |
| | | | 370/400 |
| 2014/0376548 A1 | 12/2014 | Naven et al. | |

OTHER PUBLICATIONS

International Search Report received in PCT/GB2014/051535 dated Jun. 10, 2014, 5 pages.

* cited by examiner

ENCAPSULATION ENABLED PCIE VIRTUALISATION

CROSS-REFERENCE TO RELATED APPLICATION

This application is a continuation of U.S. patent application Ser. No. 13/923,202, filed Jun. 20, 2013. This application is incorporated by reference herein in its entirety and for all purposes.

TECHNICAL FIELD

The present invention relates to methods, systems and devices for transmitting data packets from a first device to a second device.

It is often necessary to send data between devices in a computer system, for example it is often necessary to connect a processing device to a plurality of input and output (I/O) devices. Appropriate data communication is achieved by connecting the devices in such a way as to allow them to send data packets to each other over a physical link, which may be a wired link or a wireless link. The sending and receiving of data packets is often described in terms of transactions. A transaction involves one or more data packets being sent between devices.

It is known in the art to use a switch to route data packets from an output of one device to inputs of one or more other devices. Such a switch comprises one or more input ports arranged to allow the data packets to be received by the switch, and one or more output ports arranged to allow the data packets to be transmitted from the switch.

Many conventional computer systems do not share input/output (I/O) devices. That is, each computer has its own dedicated I/O endpoint devices. It is, however, advantageous to allow the sharing of I/O endpoint devices such that a plurality of computers can access one or more shared I/O endpoint devices. This allows an I/O endpoint device to appear to a computer system to be dedicated (i.e. local) to that computer system, while in reality it is shared between a plurality of computers.

Sharing of I/O endpoint devices can be implemented using what is known as I/O virtualization. I/O Virtualization allows physical resources (e.g. memory) associated with a particular I/O endpoint device to be shared by a plurality of computers. One advantage of I/O virtualization is that it allows an I/O endpoint device to appear to function as multiple devices, each of the multiple devices being associated with a particular computer.

Sharing of I/O endpoint devices can lead to better resource utilisation, scalability, ease of upgrade, and improved reliability. One application of I/O virtualization allows I/O endpoint devices on a single computer to be shared by multiple operating systems running concurrently on that computer. Another application of I/O virtualization allows multiple independent computers to share a set of I/O endpoint devices. Such computers may be connected together by way of a computer network. Rack Mounted or Blade Server type computing platforms in particular, but not exclusively, can benefit from consolidation of I/O resources.

I/O virtualization can be used to virtualize I/O endpoint devices such that computers connected to those I/O endpoint devices are provided with a virtualized representation of some or all of the I/O endpoint devices. By providing a virtualized view of I/O endpoint devices, a computer using those devices need not be connected to the particular device it is currently using. This allows for the provision of features such as load balancing, failover and port/link aggregation.

Load balancing helps to improve resource utilisation by allowing a particular computer to share work between a plurality of I/O endpoint devices. By sharing work between a number of I/O endpoint devices, bottlenecks can be avoided and work can be performed more efficiently. Failover provides a computer with continued access to at least one of a plurality of I/O endpoint devices in the event that one or more of those I/O endpoint devices becomes unavailable. Port/link aggregation allows multiple, low-bandwidth I/O endpoint devices to be represented as a single high bandwidth I/O endpoint device to (e.g., to aggregate the bandwidth of individual network connections).

It is known to use modified switches and/or modified I/O endpoint devices to enable the implementation of virtualisation. This, however, results in increased cost, less choice between components and increased complexity.

DETAILED DESCRIPTION

Figure 1:
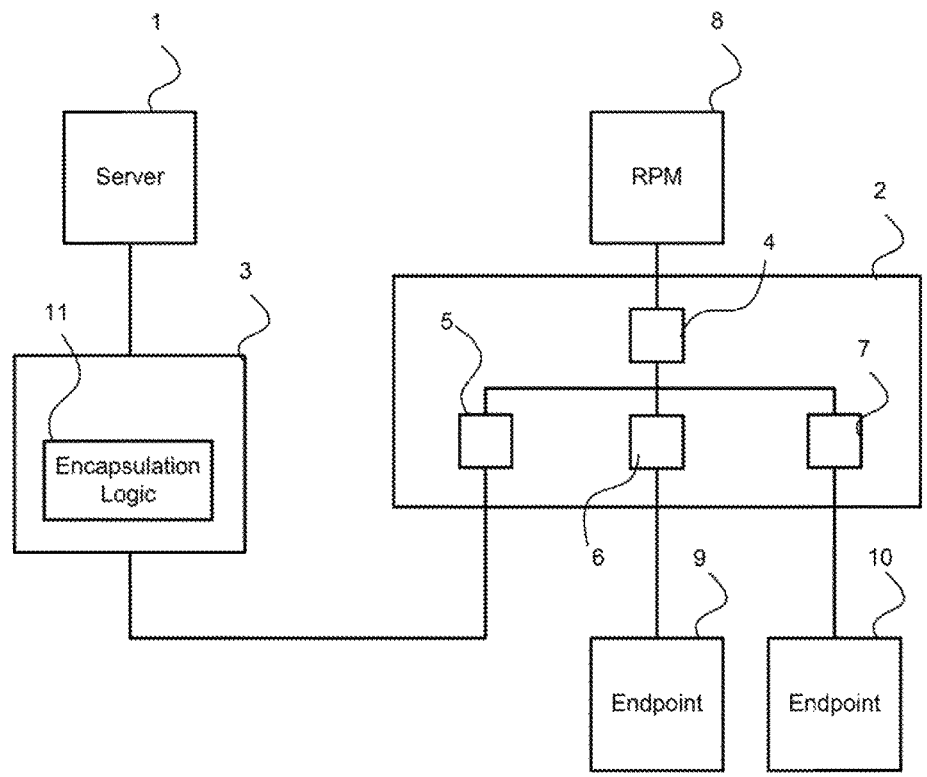
FIG. 1 is a schematic illustration showing a network comprising a server and two endpoint devices downstream of a switch.

Referring first to FIG. 1, a server 1 is connected to a switch 2 via a device 3 (referred to from hereon in as an intercepting device). In particular, the server 1 (via the intercepting device 3) is connected to a downstream bridge of the switch 2. The switch 2 comprises a single upstream (or root) bridge 4 and three downstream bridges 5, 6, 7. The server 1 is connected to the downstream bridge 5. A computing device 8 is connected to the upstream bridge 4, while two endpoint devices 9, 10 are connected to the downstream bridges 6, 7 respectively. The computing device 8 is referred to herein as a root port manager (RPM). As will be readily apparent to those skilled in the art, the server 1 (via the intercepting device 3), the RPM 8 and the endpoint devices 9, 10 connect to respective ports of the switch 2 (not shown). In particular, the RPM 8 connects to an upstream port, while the intercepting device 3, and the endpoint devices 9, 10 each connect to downstream ports of the switch 2.

Where the terms "upstream" and "downstream" are used herein it will be understood that, unless otherwise specified, these terms are used with reference to a physical device hierarchy as shown in FIG. 1 (as opposed to a virtual device hierarchy provided in some embodiments and discussed below). That is, data packets moving in a "downstream" direction travel in a direction from the upstream bridge 4 towards one of the downstream bridges 5, 6, 7. Data packets moving in an "upstream" direction travel from a downstream bridge towards the direction of the upstream bridge. As such, in arrangement of FIG. 1, the RPM 8 is in the most upstream position (or at the root of the network), while the endpoints 9, 10 and the server 1 (via the intercepting device 3) are downstream of the RPM 8 and the switch 2.

The endpoint devices 9, 10 may be any type of device. For example, the endpoint devices may be I/O endpoint devices such as network interface cards, storage devices or graphics rendering devices. One or more of the endpoint devices 9, 10 may be a device configured to process data packets to provide virtualisation of I/O endpoint devices to the server 1. Devices configured to process data packets to provide virtualisation of I/O endpoint devices are referred to herein as a virtualisation proxy controllers (VPC).

The bridges 4 to 7 of the switch 2 are referred to herein as physical bridges, by which it is to be understood that the bridges 4 to 7 are hardcoded components, to distinguish from virtual bridges which are not hard-coded components. That is, the switch 2 always provides the bridges 4 to 7. In the presently described embodiment, the switch 2 is a PCI Express (PCIe) switch. It should be noted that, in general, PCIe switches do not comprise individual hardware components that can be thought of as bridges. That is, PCIe switches are hard-coded to appear as though they comprise a predetermined number of individual hardware bridges, but the bridges may actually be provided by other means. As such, devices referred to as "physical bridges" herein may be referred to as "logical" or "virtual" bridges elsewhere, even where those bridges are a hard-coded (static) component of a switch. It is important to note, therefore, that the term virtual bridge herein denotes a non-hard-coded component and may therefore be different to components labelled "virtual bridges" elsewhere (which, if hard-coded, would properly be labelled physical bridges herein).

It is desirable that the server 1 is able to communicate with the endpoint devices 9, 10. That is, it is desirable that the server 1 is able to utilise functionality provided by the endpoint devices 9, 10. This requires that data is able to be sent between the server 1 and the endpoint devices 9, 10 via the switch 2. The switch 2, however, (operating under the PCIe protocol) prevents servers connected to downstream bridges from issuing various transactions in an upstream direction (that is, away from the server 1). The transactions which the server 1 is unable to issue in the upstream direction may be required for utilisation by the server 1 of the endpoint devices 9, 10.

In order to overcome this limitation, the intercepting device 3 is arranged to intercept data packets emanating from the server 1 towards the switch 2 and to process those data packets to enable forward transmission in the upstream direction. In particular, the intercepting device 3 comprises encapsulation logic 11 which is configured to encapsulate prohibited server transactions within an allowed transaction, thereby allowing the data packet to be routed upstream from the server 1. The intercepting device 3 may be implemented in any convenient way, and may be, for example, an FPGA or an ASIC.

In more detail, PCIe transactions can, for present purposes, be considered as either configuration transaction configuration transactions or data transactions. Further, transactions using the PCIe protocol can generally be classified into one of five classes:

1. Commands sent from a server to an endpoint device;
2. Status read commands sent by a server relating to resources of an endpoint device;
3. Endpoint device commands reading command descriptors in server memory;
4. Endpoint device commands writing status descriptors in server memory; and
5. Endpoint device commands reading/writing data buffers in server memory.

Transactions classified in class 1 of the above list are considered to be configuration transactions, and data packets of such transactions are those transactions not allowed to be routed from the server 1 in an upstream direction through the switch 2. Transactions classified in classes 2 to 5 are considered to be data transactions (e.g. memory read or memory write transactions) and data packets of such transactions are able to be routed from the server 1 in an upstream direction through the switch. That is, data packets of transactions in class 2 to 5 are able to be routed from the server 1 to the endpoint devices 9, 10 through the switch 2. The encapsulation logic 11 of the intercepting device 3 is therefore arranged to encapsulate data packets classified in the class 1 of the above list within a data transaction (either a memory read or a memory write). Transactions which may be routed in an upstream direction through the switch 2 are sometimes referred to herein as "allowed transactions", while transactions which may not be routed in a upstream direction through the switch 2 are sometimes referred to herein as "disallowed transactions". Additionally, as is described in more detail below, data packets classified in the classes 2 to 3 may also be encapsulated within a memory read or a memory write data packet, in order to achieve particular routing requirements.

Figure 2A:
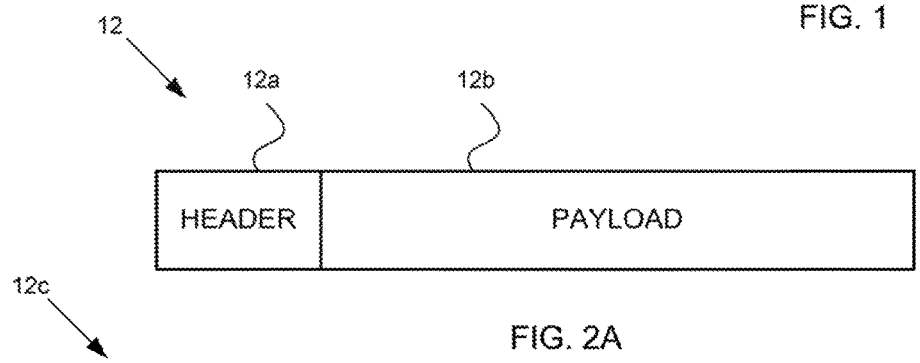
FIG. 2A is a schematic illustration of a data packet.

FIG. 2A schematically illustrates a PCIe data packet 12 comprising a header portion 12*a* and a payload portion 12*b*. As is well known by those skilled in the art, the header portion 12*a* comprises information identifying the type of data packet (e.g. memory write, memory read, configuration, etc), information identifying the sender (a requester identifier), and information enabling the device to which the data packet is to be routed to be determined.

Figure 2B:
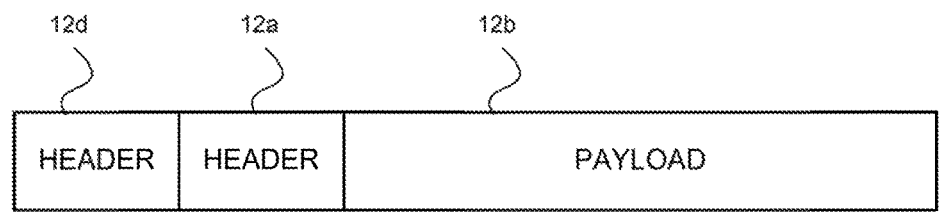
FIG. 2B is a schematic illustration of the data packet of FIG. 2A encapsulated in accordance with an embodiment.

FIG. 2B schematically illustrates an encapsulated data packet 12*c* comprising the data packet 12 after encapsulation by the intercepting device 3. In particular, it can be seen that an additional header 12*d* has been added to the data packet 12, the header 12*d* being a header associated with transactions that can be routed upstream through the switch 2. For example, the header 12*d* may be a header associated with a memory data write transaction.

Figure 3A:
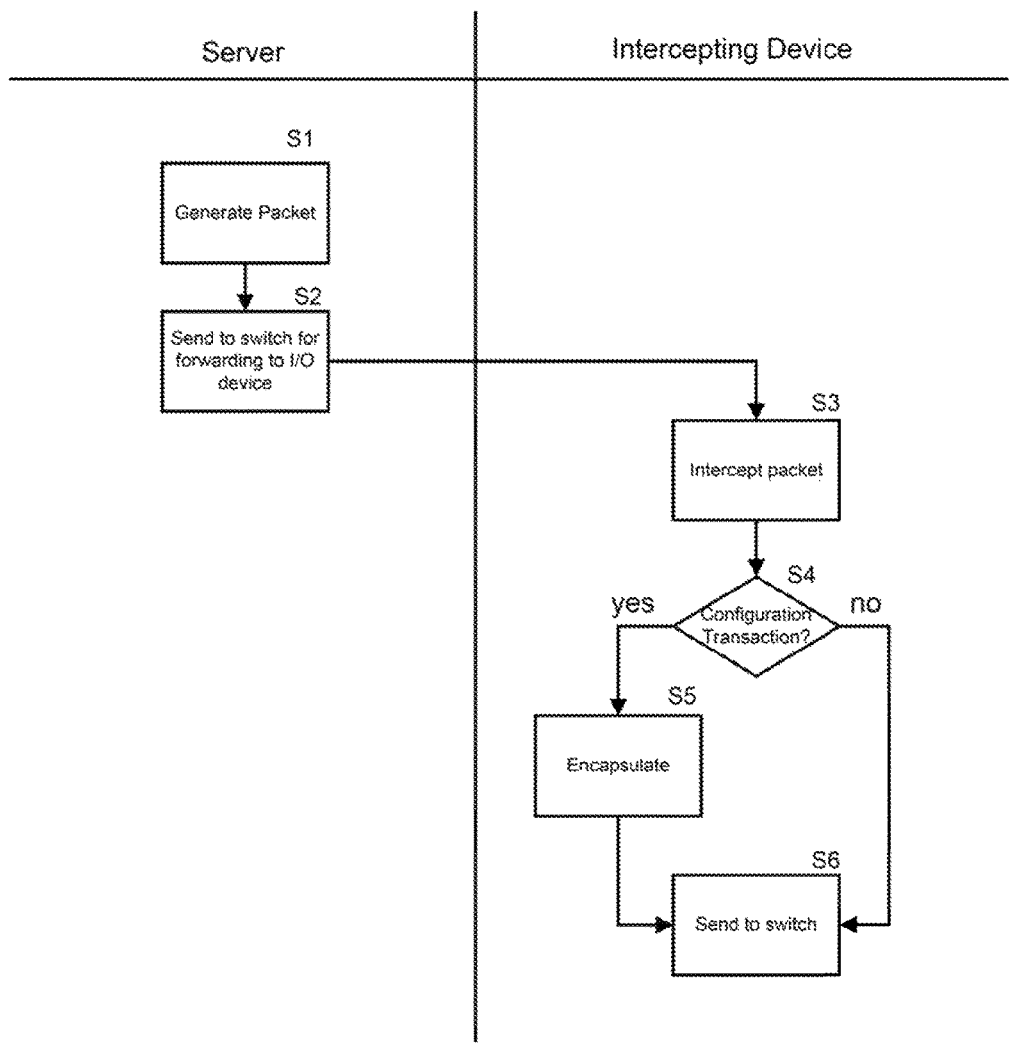
FIGS. 3A and 3B are flowcharts showing processing carried out by components of the network of FIG. 1 to transmit and receive data packets respectively.

FIG. 3A is a flowchart illustrating processing carried out by the server 1 and the intercepting device 3 when forwarding data packets to the switch 2 for onward transmission to one of the devices 9, 10. At step S1 the server 1 generates a data packet for onward transmission through the switch 2 to one of the devices 9, 10. The data packet may be of a transaction classified in one of classes 1 to 4 of the above list, or may be a data packet of a transaction classified in class 5 of the above list. Processing passes from step S1 to step S2 at which the server transmits the data packet to the switch 2.

At step S3, the intercepting device 3 intercepts the data packet generated at step S1 and, at step S4, determines whether the data packet belongs to a configuration transaction (that is, a data packet of a transaction classified in class 1 of the above list). If, at step S4, it is determined that the data packet is a data packet of a configuration transaction, processing passes to step S5, at which the data packet is encapsulated within a data packet of an allowed transaction. Processing passes from step S5 to step S6, at which the encapsulated data packet is transmitted to the switch 2 for onward transmission to the intended target (e.g. the endpoint device 9, 10).

If, on the other hand, it is determined at step S4 that the data packet is not part of a configuration transaction, processing passes directly from step S4 to step S6 at which the data packet is transmitted to the switch 2 without encapsulation.

Figure 3B:
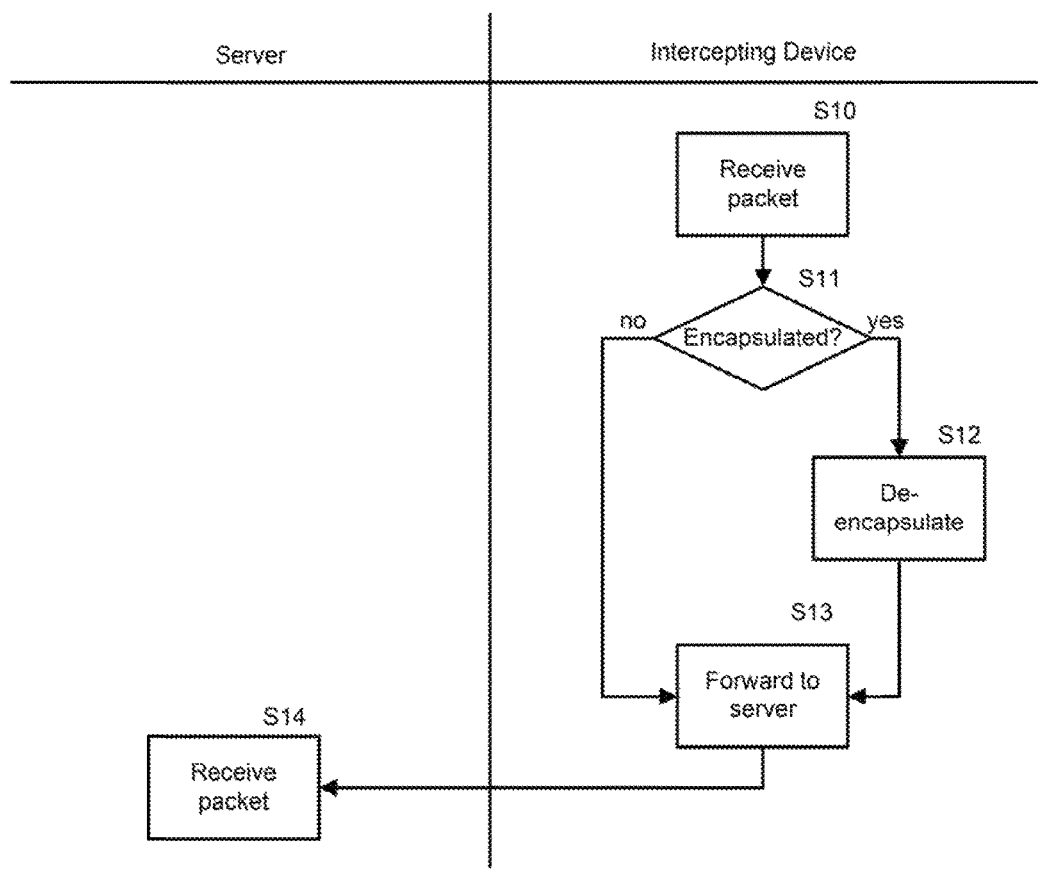

FIG. 3B is a flowchart illustrating processing performed by the intercepting device 3 and the server 1 upon receipt, at the intercepting device 3, of a data packet from one of the devices 9, 10 through the switch 2. At step S10 a data packet is received at the intercepting device 3. Processing passes to step S11 at which it is determined whether the data packet is encapsulated. That is, it will be appreciated that data packets travelling to the server 1 from a device that is also connected to a downstream bridge in the switch 2 may also be encapsulated within a data packet of an allowed transaction type, if it is to be routed through the switch 2 to the server 1.

If it is determined at step S11 that the data packet received at step S10 is an encapsulated data packet, processing passes from step S11 to step S12, at which the encapsulated data packet is de-encapsulated. That is, at step S12 the intercepting device 3 removes the header information relating to the data packet of the allowed transaction class to retrieve the original data packet of the disallowed transaction class. Processing passes from step S12 to step S13, at which the intercepting device 3 forwards the de-encapsulated data packet to the server 1. The de-encapsulated data packet is received by the server 1 at step S14. If, on the other hand, it is determined at step S11 that the data packet received at step S10 is not an encapsulated data packet, processing passes directly from step S11 to step S13. In this case, the data packet received at step S10 is forwarded to the server 1 at step S13 and received by the server 1 at step S14, without de-encapsulation.

Figure 4:
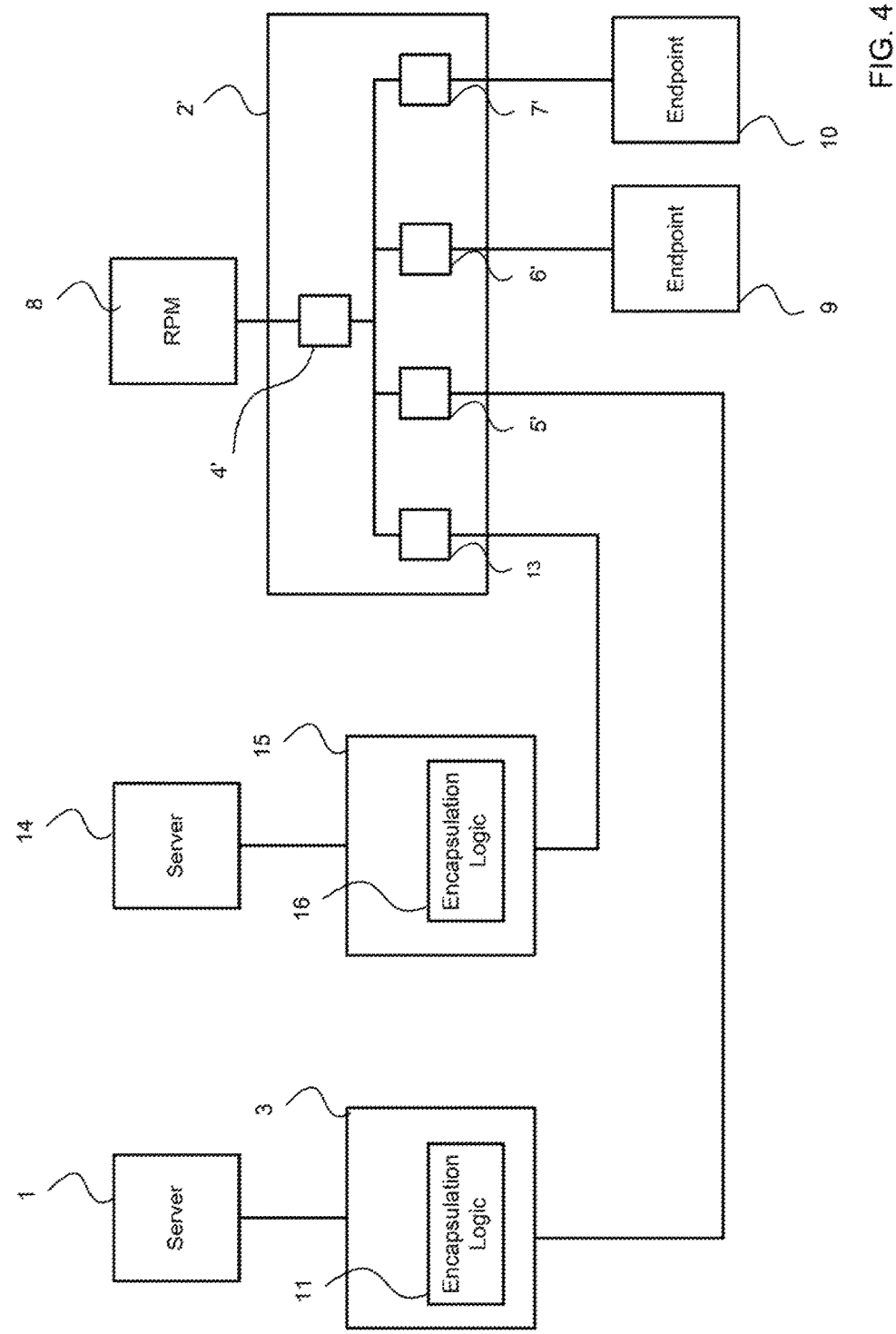
FIG. 4 is a schematic illustration of a network showing two servers connected downstream of a switch.

While only a single server 1 is shown in FIG. 1, the processing described above with reference to FIGS. 3A and 3B is particularly beneficial where multiple servers are connected to downstream bridges of a switch, the multiple servers sharing resources provided by endpoint devices connected to other downstream ports of the switch. Referring to FIG. 4, there is illustrated an arrangement similar to the arrangement of FIG. 1, but comprising two servers. In the arrangement of FIG. 4, the computing device 8 is connected to an upstream port 4' of a switch 2'. The switch 2' further comprises four downstream bridge 5', 6', 7' and 13. The server 1 is connected via the intercepting device 3 to the downstream bridge 5' and the endpoint devices 9, 10 are connected to the downstream bridges 6', 7' respectively. Additionally, a server 14 is connected to the downstream bridge 13 via an intercepting device 15, the intercepting device 15 comprising encapsulation logic 16. The intercepting device 15 and encapsulation logic 16 are configured to process data packets transmitted from the server 14 and received from the switch 2' as described above with reference to FIGS. 3A, 3B. In this way, both the servers 1, 14 can communicate with, and therefore share the resources provided by, the devices 9, 10.

Sharing of endpoint devices can be implemented using what is known as I/O virtualisation. I/O virtualisation allows physical resources (e.g. memory) associated with a particular I/O endpoint device to be shared by a plurality of computers such as the servers 1, 14. One advantage of I/O virtualisation is that it allows an I/O endpoint device to appear to function as multiple devices, each of the multiple devices being associated with a particular server. Sharing of I/O endpoint devices can lead to better resource utilisation, scalability, ease of upgrade and improved reliability.

In prior art networks, a server that is to utilise I/O endpoint devices to which it is connected enumerates all of the devices in the network to which it is connected using a depth-first search. The enumeration process is intended to apply identifiers to each device connected to the network, and to allow the server to obtain information as to what devices are connected to the network. In known PCIe networks, servers are connected to the upstream bridge of a switch. That is, the server would reside at the root (i.e. most upstream point) of a PCIe network and enumerate the downstream devices. It will be appreciated, however, that in the arrangement of FIGS. 1 and 4, the RPM 8 is at the root of the networks depicted therein, with both the servers 1 and 14 being connected to downstream bridges.

In order to implement virtualisation in some embodiments, servers are presented with a virtual network hierarchy with the server at the root of the virtual network hierarchy. As such, the enumeration operation performed by servers may proceed as normal (from the server's perspective) and results in the assignment of identifiers to each of the virtual devices with which the server has been presented. A process for providing the server 1 with a virtual network hierarchy is now described with reference to the arrangement of FIG. 1.

Figure 5:
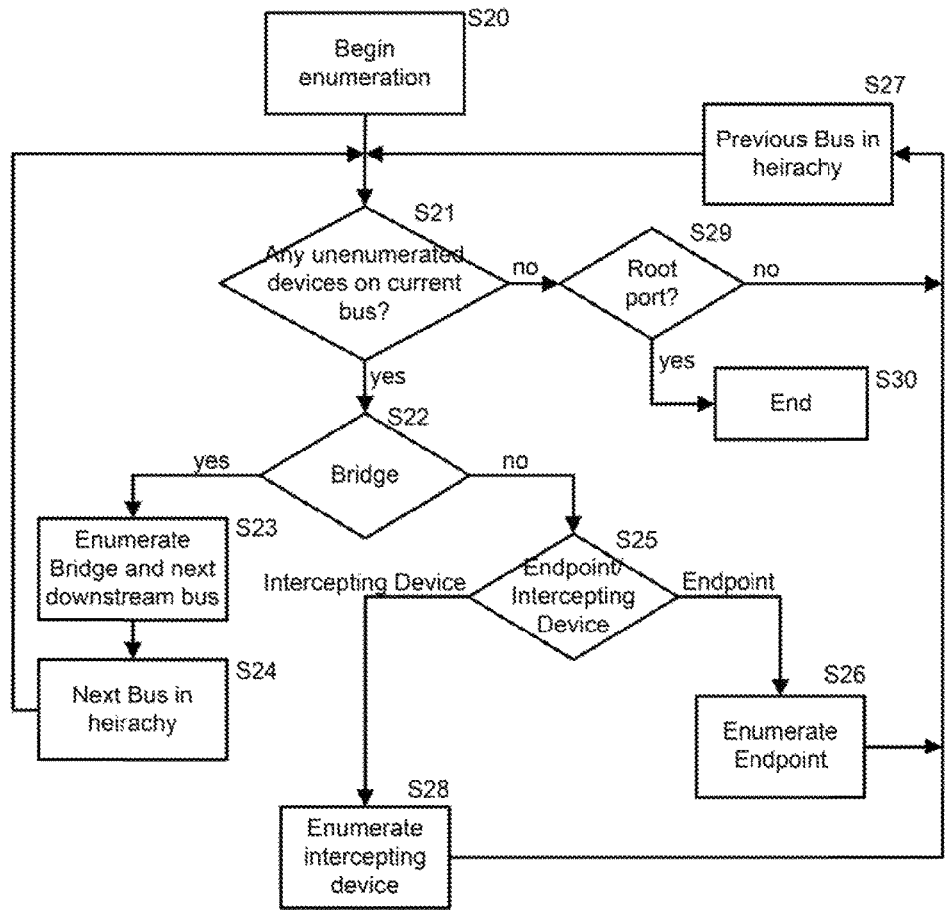
FIG. 5 is a flowchart showing processing carried out by a root port manager component of the network of FIG. 1 to enumerate the network of FIG. 1.

Referring to FIG. 5, there is shown a flowchart illustrating processing carried out by the RPM 8. In general terms, the RPM 8 enumerates each of the downstream physical devices in its network. The bus, device and function identifiers described below are provided only for example and ease of description. At a step S20 enumeration of the network begins when enumeration software running on the RPM 8 sends an enumeration control data packet (i.e. a configuration read packet) along the connection from the RPM 8 to the switch 2, to determine, at step S21, whether there are any devices connected to that connection which have not been enumerated. The connection from the RPM 8 to the bridge 4 is enumerated as BUS0. If it is determined that there is an unenumerated device connected to the BUS0, that device will respond to the enumeration control data packet by returning a response control data packet (i.e. a configuration completion packet) identifying itself to the enumeration software.

If it is determined that an unenumerated device is connected to BUS0 (i.e. a response control data packet has been received), processing then passes to step S22 and, based on the information in the response control data packet, it is determined whether the device connected to the current bus (BUS0) is a bridge. If the device connected to the current bus is a bridge, processing passes to step S23, and the bridge is assigned a device number by the enumeration software. For example, the first device enumerated on BUS0 may be assigned the device number 0. The downstream (i.e. away from the RPM 8) connection from the device 0 is assigned the next available bus number. For example, where a bridge is the first enumerated device connected to BUS0, the downstream connection from that bridge may be enumerated as BUS1.

From step S23 processing passes to step S24, at which the enumeration software inspects the next bus in the network hierarchy (i.e. by sending enumeration data packets). Processing then passes to step S21, at which it is determined whether there are any unenumerated devices connected to the current bus (i.e. the bus selected at step S24). Processing loops through steps S21 to S24 until there are no further bridges in a particular branch of the PCIe being enumerated.

If, at step S22, it is determined that an unenumerated device connected to a bus is not a bridge, processing passes from step S22 to step S25. At step S25 it is determined whether the unenumerated device is an endpoint device (such as an I/O device or a virtualisation proxy controller) or is an intercepting device such as the intercepting device 3. If it is determined, at step S25, that the unenumerated device is an endpoint device, processing passes from step S25 to step S26, and the endpoint is enumerated with a device number unique for the bus on which it is connected. Additionally, PCIe endpoint devices may provide up to eight independent functions. Each function is enumerated separately. In the example of FIG. 1, it is assumed that each endpoint device 9, 10 only provides a single function. As such, that single function is enumerated as function 0 of each respective endpoint device.

As there are no further PCIe connections from an endpoint, processing passes from step S26 to step S27, at which the enumeration software returns to the previous bus in the network hierarchy to determine, at step S21, whether there are any devices on that bus which have yet to be enumerated.

If, at step S25, it is determined that the unenumerated device is an intercepting device, processing passes from step S25 to step S28 at which the enumeration software assigns a device, and function number to the intercepting device. The enumeration software does not enumerate beyond the intercepting device. As described in further detail below, the enumeration software operating on the RPM 8 will configure virtual devices to be provided by each intercepting device after enumeration of the physical hierarchy. From step S28 processing passes to step S27.

If, at step S21, it is determined that there are no unenumerated devices on the current bus, processing passes to step S29 at which it is determined whether the current bus is the root bus (i.e. the most upstream bus) of the network hierarchy (i.e. the BUS0). If, at step S29, it is determined that the current bus is not the root, processing passes to step S27, and the enumeration software returns to the previous bus in the network hierarchy to determine, at step S21, whether there are any devices on that bus which have yet to be enumerated.

If, on the other hand, it is determined at step S29 that the current bus is the root bus, this shows that every branch of the physical network hierarchy has been traversed such that there are no further bridges, endpoints or intercepting devices in the network to be enumerated, and processing therefore ends at step S30.

Further, at step S23, in addition to assigning device and bus numbers (as in a standard PCIe enumeration operation) to the bridge, the RPM 8 is configured to write unique values to registers of the downstream bridges, in order to enable deterministic peer-to-peer connectivity between devices connected to the downstream bridges 5, 6, 7 of the switch 2. In particular, the RPM 8 is configured to associate an identifier that is unique across all switches controlled by the RPM 8. The unique value associated, by the RPM 8, with the bridge is referred to herein as an "address routing field" (AF) value, which uniquely identifies, in the physical device hierarchy, the address of the device connected to the downstream bridge.

Figure 6:
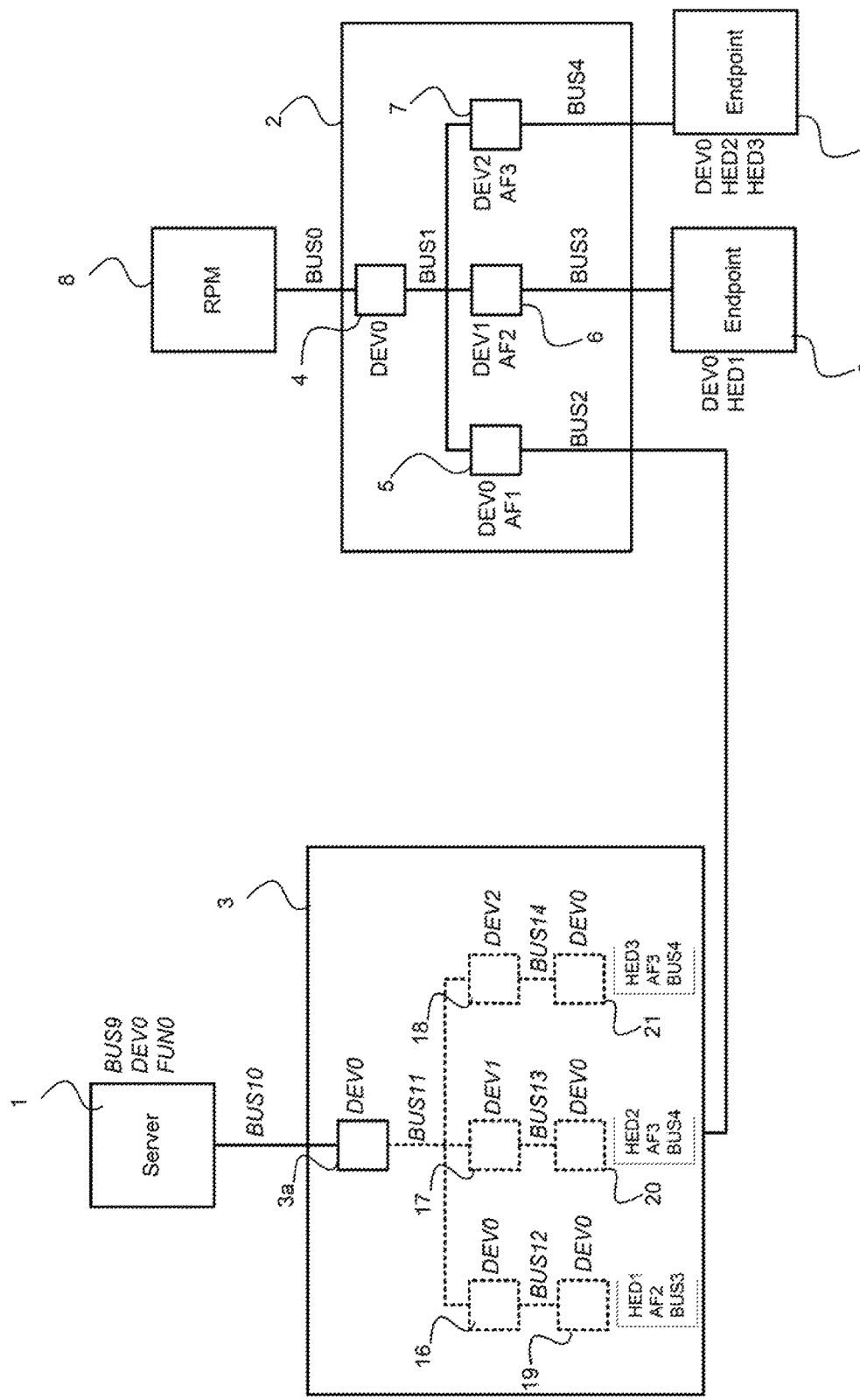
FIG. 6 is a schematic illustration of the network of FIG. 1 showing a virtual device hierarchy.

To aid understanding of the processing described with reference to FIG. 5, an example is now provided with reference to the arrangement illustrated in FIG. 6. The arrangement of FIG. 6 is the same as that of FIG. 1. It will be understood that the device and bus numbers assigned by the RPM 8 are merely provided as examples for the purpose of explanation.

The RPM 8 enumerates its connection to the switch 2 as BUS0. At step S20, the RPM 8 transmits an enumeration control data packet along BUS0. At step S21 it is determined that there is a device connected to the current bus (BUS0) when the bridge 4 responds to the enumeration control data packet. At step S22 it is determined, from the information contained in the response, that the device connected to BUS0 is a bridge (i.e. the upstream bridge 4 within of the switch 2). At step S23, the bridge 4 is enumerated as device 0 on the bus BUS0. The downstream connection from the bridge 4 is enumerated as BUS1.

At step S24 the enumeration software proceeds to inspect the next bus in the hierarchy, i.e. BUS1, and processing returns to step S21. At step S21 it is determined that a device, the bridge 5, is connected to the current bus (BUS1), and at step S22 it is determined that the device is a bridge. At step S23 the bridge 5 is enumerated as device 0 on BUS1 and the downstream connection from the bridge 5 is enumerated as BUS2. The bridge 5 is assigned an AF value of "AF=1". As such, the Intercepting device 3/server 1 may be identified in the physical hierarchy as AF=1.

At step S24 the enumeration software proceeds to inspect the next bus in the hierarchy, BUS2, and processing returns to step S21. At step S21, it is determined that there is a device connected to BUS2, and at step S22 it is determined that this device is not a bridge. Processing passes to step S25 at which it is determined that the device is an intercepting device. Processing of the BUS2 therefore pauses and processing passes to step S27 at which the previous bus in the hierarchy, BUS1, is examined.

It is determined at step S21 that there is an unenumerated device on BUS1 and processing passes to step S22. At step S22, it is determined that the next unenumerated device is a bridge (i.e. the bridge 6) such that processing passes to step S23. At step S23 the bridge 6 is enumerated as device 1 on BUS1, the downstream connection from the bridge 6 is enumerated as BUS3 and the bridge 6 is assigned an AF value of "AF=2" (which can now be used to route data packets to the endpoint 9 as described in more detail below). At step S24 the enumeration software proceeds to inspect the next bus in the hierarchy, BUS3. At step S21 it is determined that there is a device connected to BUS3, and at step S22 it is determined that the device is not a bridge. At step S25 it is determined that the device is an endpoint and processing therefore passes to step S26.

At step S26 the endpoint device 9 is enumerated as device 0 on BUS3. It is assumed for the purposes of explanation of FIG. 6 that the endpoint device 9 and the endpoint device 10 each provide only a single function. That is, while PCIe endpoint devices may provide up to eight independent functions, only a single function is considered for the present example. However, it will be readily appreciated from the description herein that multiple functions may be utilised in other embodiments of the present invention.

Processing then passes to step S27 and the previous bus in the hierarchy, i.e. BUS1 is set to be the current bus. It is determined at step S21 that there is an unenumerated device on BUS1 (i.e. the bridge 7) and processing passes to step S22. At step S22, it is determined that the next unenumerated device is a bridge such that processing passes to step S23. At step S23 the bridge 7 is enumerated as device 2 on BUS1, the downstream connection from the bridge 7 is enumerated as BUS4 and the bridge 7 is assigned an AF value of "AF=3". At step S24 the enumeration software sets the next bus in the hierarchy, BUS4, as the current bus. At step S21 it is determined that there is a device (i.e. the endpoint device 10) connected to BUS4, and at step S22 it is determined that the device is not a bridge. At step S25 it is determined that the device is an endpoint and processing therefore passes to step S26.

At step S26 the endpoint device 10 is enumerated as device 0 on BUS4. Processing then passes to step S27 and the previous bus in the hierarchy, i.e. BUS1 is set to be the current bus.

At step S21 it is determined that there are no further devices on the current bus, and at step S29 it is determined that the current bus is not the root of the network hierarchy. Processing therefore passes to step S27 and the previous bus in the hierarchy (BUS0) is set to be the current bus.

There are no unenumerated devices connected to BUS0, and processing therefore passes to step S29, at which it is determined that the current bus is the root of the network hierarchy. Processing passes from step S29 to end at step S30.

Having enumerated the physical network hierarchy, the RPM 8 assigns a desired number of virtual copies of each physical endpoint device to the server 1 and communicates the virtual device hierarchy. It will be appreciated that the exact structure of any virtual device hierarchy will be application dependent. In particular, it will be understood that the virtual hierarchy need not be the same as the physical hierarchy. An example arrangement is, however, shown in FIG. 6, in which a virtual network hierarchy is shown within the intercepting device 3. The virtual network hierarchy comprises three virtual bridges 16, 17, 18, having respective downstream virtual buses with each virtual bus connecting to a respective virtual endpoint device 19, 20, 21. By "virtual", it is meant that the virtual bridges 16, 17, 18 and the virtual endpoint devices 19, 20, 21 are not always provided by the intercepting device 3, but rather are dynamically configured as required. Virtual components are shown in dashed outline to distinguish them from physical components.

Before the RPM 8 has finished constructing the virtual network hierarchy, the server 1 is prevented from performing an enumeration. This may be achieved using code stored within the intercepting device 3 to delay the server 1 while the RPM 8 completes the establishment of a virtual device hierarchy.

The RPM 8 will assign appropriate device numbers to the virtual bridges and virtual endpoints, such that they will be discovered by the standard server enumeration procedure. Further, virtual endpoint devices are assigned a unique identifier by the RPM 8, referred to herein as a HED ("host endpoint device"), so that the virtual endpoint devices can be uniquely identified. For example, the device numbers and HED values for a particular physical endpoint device may be assigned by the RPM 8 at step S26 of FIG. 5. Use of the HED value is explained in more detail below with reference to FIG. 12 to 17 and processing using a virtualisation proxy controller.

After the construction, by the RPM 8, of a virtual network hierarchy within the intercepting device 3, the server 1 begins an enumeration operation to enumerate the devices in its network hierarchy. From the point-of-view of the server 1, the server 1 is at the root of a network hierarchy and so attempts to enumerate its downstream devices in the standard way, i.e. by issuing enumeration control data packets. The intercepting device 3 responds to the enumeration control packets issued by the server 1 based upon the virtual hierarchy which has been constructed by the RPM 8. As such, the server 1 is unaware that the virtual bridges 16, 17, 18, the virtual endpoint devices 19, 20, 21 and the virtual buses connecting the virtual bridges to the virtual endpoint devices are virtual components. With reference to FIG. 6, there is now described an example of how the server 1 may enumerate the devices in the virtual hierarchy provided by the intercepting device 3. It will be understood that the device and bus numbers referred to below are merely provided as examples for the purpose of explanation. Server assigned identifiers are shown in italics in FIG. 6.

The server 1 enumerates itself as function 0 of device 0 on a bus BUS9. The bus connecting the server 1 to the intercepting device 3 is enumerated as BUS10 and an upstream bridge 3a provided by the intercepting device 3 is enumerated as device 0 on BUS10. The bus BUS10 is shown in solid line as there is a real connection between the server 1 and the intercepting device 3. Further, because at least one bridge will always be required, the bridge 3a may be a physical bridge (i.e. the bridge 3a may be a "hard-coded" feature of the intercepting device). The bridge 3a is shown in solid outline to indicate that the bridge 3a of FIG. 6 is implemented as a physical bridge. It will be appreciated that more than one physical bridge may be provided by the intercepting device 3. The virtual bus downstream from the bridge 3a is enumerated as BUS11 while the virtual bridge 16 is enumerated as device 0 on BUS11. The virtual bus connecting the virtual bridge 16 to the virtual endpoint device 19 is enumerated as BUS12 and the single function of the virtual endpoint device 19 is enumerated as function 0 of device 0 on BUS12.

The virtual bridge 17 is enumerated as device 1 on BUS11, while the virtual bus connecting the virtual bridge 17 with the virtual endpoint device 20 is enumerated as BUS13. The single function of the virtual endpoint device 20 is enumerated as function 0 of device 0 on BUS13. The virtual bridge 18 is enumerated as device 2 on bus 11, while the virtual bus connecting the virtual bridge 18 with the virtual endpoint device 21 is enumerated as BUS14. The single function of the virtual endpoint device 21 is enumerated as function 0 of device 0 on BUS14.

It can be seen therefore that following enumeration, the server 1 believes that it has access to resources provided by three physical endpoint devices. The resources provided by the virtual endpoint devices 19, 20, 21 are, in fact, provided by the endpoint devices 9, 10. In particular, the virtual endpoint device 19 is provided by the endpoint device 9, while the resources provided by the virtual endpoint devices 20, 21 are provided by the endpoint device 10. The intercepting device 3 therefore stores associations between the enumerations of the virtual endpoint devices made by the server 1 and the unique identifiers assigned by the RPM 8 to the physical endpoint devices that are to provide the appropriate resources. In particular, the intercepting device 3 associates the server enumeration [function 0 of device 0 on BUS12] with the identifier [AF2, BUS3, HED1], associates the server enumerations [function 0 of device 0 on BUS13] with the identifier [AF3, BUS4, HED2], and [function 0 of device 0 on BUS14] with the identifier [AF3, BUS4, HED3]. The HED values assigned by the RPM 8 to each virtual device are also shown next to the physical endpoint device that provide the functionality for that virtual endpoint device.

Figure 7:
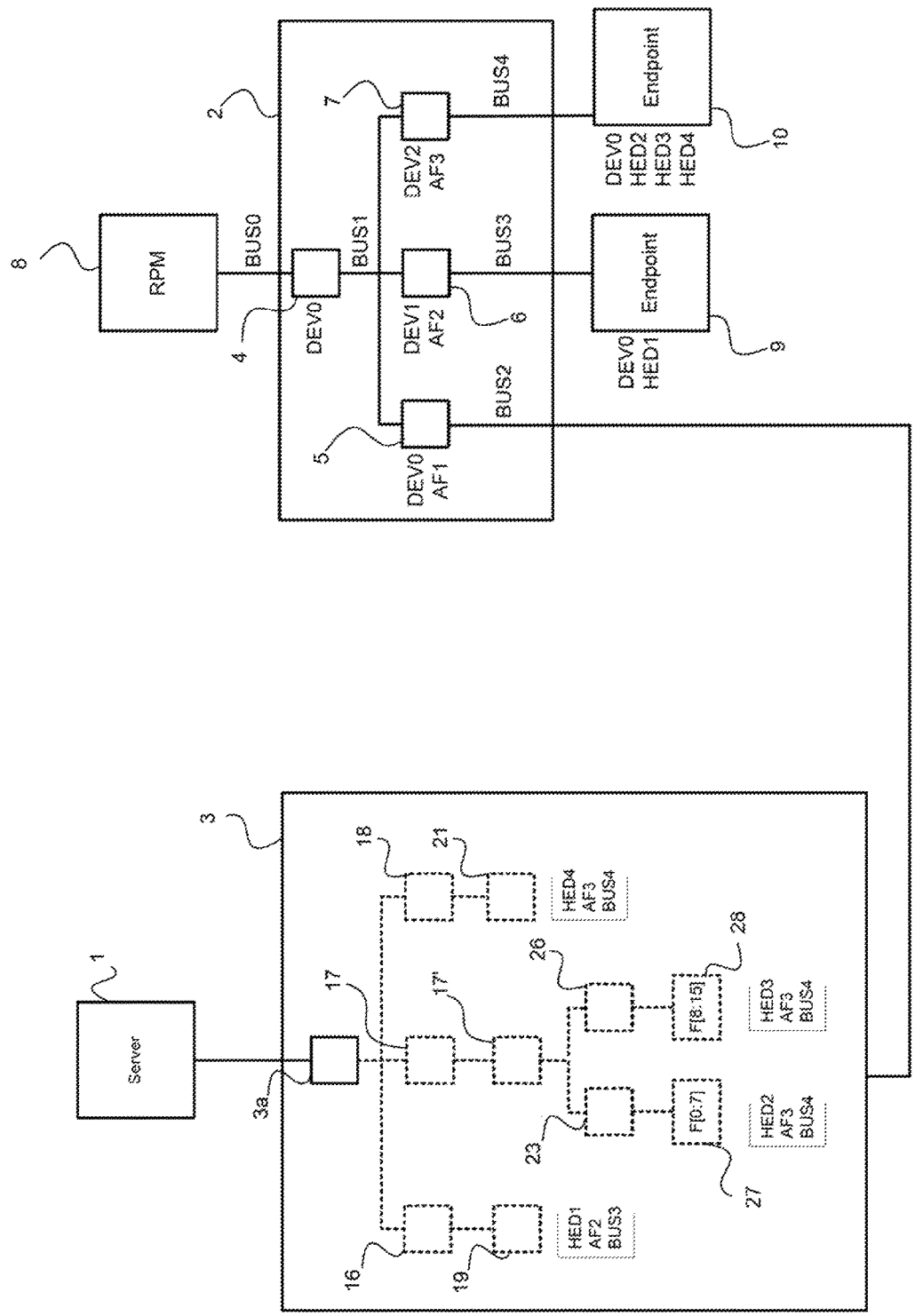
FIG. 7 is a schematic illustration of the network of FIG. 1 showing an alternative virtual device hierarchy.

As described above, in PCI Express, each endpoint device may have up to eight logically independent functions. Each independent function of a device has a unique identifier comprised of the PCIe bus number of the bus on which the device is connected, the device number of the device and a function number, each of which is assigned to the endpoint device during enumeration by the configuration software (which in the arrangement of FIG. 5 operates on the RPM 8). Virtual hierarchies may therefore be created by the RPM 8 to utilise physical functions provided by any physical endpoint devices. Further, virtual functions may be provided within the virtual hierarchy configured within the intercepting device 3. FIG. 7 shows, by way of further example, an alternative virtual hierarchy that may be provided using the physical hierarchy shown in FIG. 1.

Referring to FIG. 7, the RPM 8 has enumerated the physical hierarchy as described with reference to FIG. 5. That is, as in FIG. 5, the endpoint devices 9, 10 each provide a single function. In the arrangement of FIG. 7, the virtual hierarchy provided to the intercepting device 3 comprises six virtual bridges, the virtual bridges 16, 17, 18 and an additional three virtual bridges 17', 23, 26 connected downstream of the virtual bridge 17. The virtual endpoint device 19 is again connected to the virtual bridge 16 and the virtual endpoint device 21 is again connected to the virtual bridge 18. A virtual endpoint device 27 is connected to the virtual bridge 23 and a virtual endpoint device 28 is connected to the virtual bridge 26. The virtual hierarchy is configured by the RPM 8 such that the virtual endpoint devices 27 and 28 appear to each provide eight independent functions. That is, the virtual endpoint devices 27 and 28 provide eight virtual functions (indicated in FIG. 7 by the designation [0:7] on the virtual endpoint device 27 and [8:15] on the virtual endpoint device 28). As such, during enumeration by the server 1, each of the virtual functions provided by the virtual endpoint devices 27 and 28 is assigned a unique identifier as described above. The RPM 8 has provided the virtual endpoint devices 19, 27, 28, 21 with HED values of HED1, HED2, HED3 and HED4 respectively (the HED values are also shown, in FIG. 7, next to the physical endpoint devices that provide the functionality for the virtual endpoint devices assigned those HED values). The identifiers provided by the server 1 during the server's enumeration are not shown in FIG. 7.

In the above example described with reference to FIG. 7, the endpoint devices 9, 10 each provide only a single function, such that all virtual functions provided by a virtual endpoint device are provided by the single function of the physical endpoint device that corresponds to the virtual endpoint device. It will be appreciated, however, that, for example, the eight virtual functions provided by the virtual endpoint device 27 may be provided by more than one function provided by a physical endpoint device. For example, the physical endpoint device 9 may itself provide eight functions, each of the eight functions corresponding to a respective virtual function provided by the virtual endpoint device 27.

Both the arrangements of FIGS. 6 and 7 are provided merely as examples. It will be appreciated that any appropriate virtual hierarchy may be configured within the intercepting device 3 as required.

After enumeration of the virtual hierarchy by the server 1, it is necessary to ensure that data packets which are addressed to virtual endpoint devices/functions reach the correct physical destination. The correct physical destination may be the physical endpoint device/function with which the virtual endpoint device/function is associated, or as described in more detail below, may be a proxy controller.

As described above, data packets that belong to transactions which cannot be sent upstream through the switch 2 (i.e. to the RPM 8 or to one of the endpoint devices 9, 10) are encapsulated within a data packet of a type that can be sent upstream through the switch 2. It will be appreciated that where a virtual device hierarchy is provided to the server 1, the server 1 will address the data packets it creates to virtual endpoint devices rather than the physical endpoint devices that provide the required resources. As such, in addition to encapsulation of some data packets, the intercepting device 3 also ensures that data packets issued by, and to be received by, the server 1 are correctly routed through the physical device hierarchy. This is described in more detail below with reference to FIGS. 8, 9 and 10 and with reference to the arrangement of FIG. 6.

Figure 8:
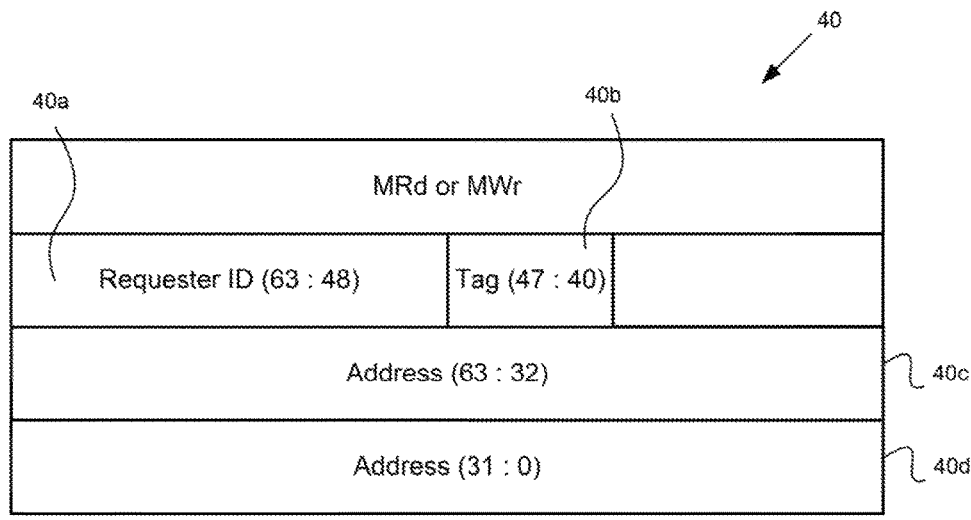
FIGS. 8 to 11 are schematic illustrations of data packet formats when modified according to some embodiments.

FIG. 8 schematically illustrates the structure of a standard memory write (or memory read) data packet header 40. As will be readily appreciated by those skilled in the art, the header 40 comprises a sixteen bit requester ID field 40a indicating the device that issued the data packet to which header 40a belongs. As described above, the requester ID field of a PCIe data packet comprises a function, device and bus number. The header 40 further comprises an eight bit tag field 40b. A PCIe transaction may be made up of a request data packet and one or more corresponding completion data packets. Each request data packet is associated with a value which is stored in the tag field 40b. Each corresponding completion data packet has the same value stored in the tag field 40b, thus associating a completion data packet with the relevant request data packet Unique tag values are allocated to all outstanding requests that require one or more completion data packets from a destination device.

The header 40 further comprises a sixty-four bit address, shown as two thirty-two bit fields. A first field 40c makes up the most significant thirty-two bits of the address, while the second field 40d makes up the thirty-two least significant bits of the address. The server address fields 40c, 40d indicate a location within a memory (e.g. of the server 1) from which data is to be read (or to which data is to be written).

Upon intercepting a data packet comprising the header 40, the intercepting device 3 identifies, from address fields 40c, 40d (with reference to the PCIe Base and Limit address registers written to the virtual devices within the virtual device hierarchy by the server 1 during enumeration), the virtual endpoint device to which the data packet has been addressed (by the server 1). The intercepting device 3 further identifies the identifiers of the physical endpoint device to which the data packet should be transmitted. The intercepting device 3 then modifies the data packet as described in more detail below, for transmission to the identified physical device. In some circumstances the modification may comprise encapsulation, while in others encapsulation is not required.

As indicated above, the decision as to which physical device (e.g. endpoint device or the RPM 8) a data packet should be sent will be application-specific. For example, the data packet may be sent directly to the endpoint device providing the resources being virtualized by the virtual device to which the server addressed the data packet. It will be appreciated that this requires that the endpoint device receiving the data packet is configured to support virtualisation as described above, and to properly process the modified data packet. For example, the receiving endpoint device may be configured to process data packets similarly to the intercepting device 3 and may be provided with a representation of the virtual hierarchy enumerated by the server 1. Alternatively, a corresponding intercepting device may be provided between each endpoint device and the switch 2. Alternatively, the data packet may be transmitted to a device (sometimes referred to as a virtualisation proxy controller) adapted to process the modified data packet to support virtualisation of endpoint devices in a network hierarchy. Such a virtualisation proxy controller device and its use for facilitating virtualisation of devices across a network is described in U.S. patent application Ser. No. 12/430,480, United States Patent Publication No. US2009/ 0307388, United States Patent Publication No. US 2011-0069710 and United States Patent Publication No. US2010/ 0146160.

There are now described examples of modification of data packets performed by the intercepting device 3. An example of modification without encapsulation is described with reference to FIG. 9, while an example of modification with encapsulation is described with reference to FIGS. 10 and 11.

Figure 9:
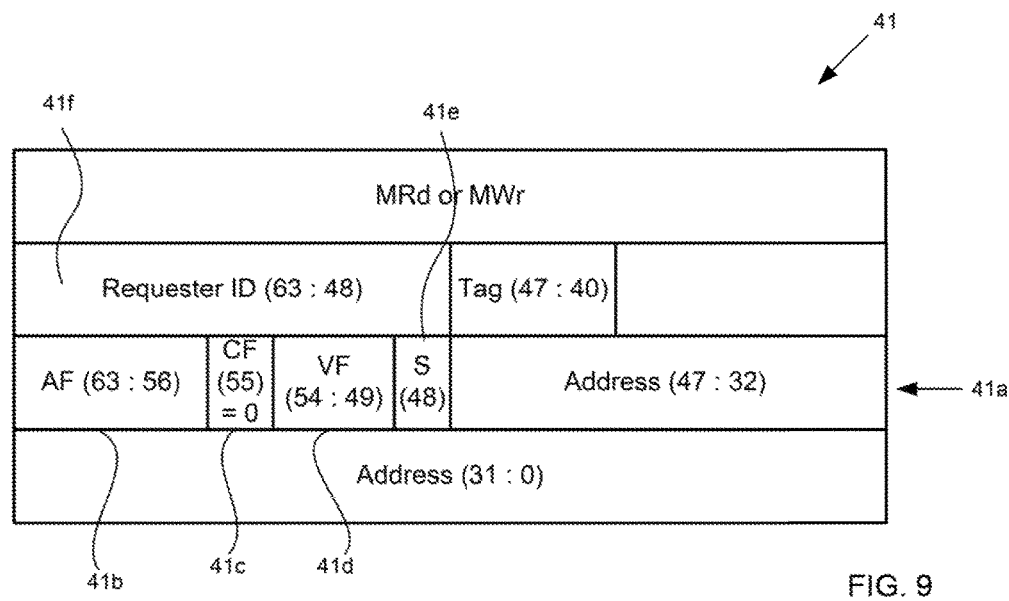

FIG. 9 schematically illustrates a memory write, or memory read, data packet header 41, modified, without encapsulation, by the intercepting device 3 to enable routing to a physical device where the address specified in an original data packet relates to a virtual device. It was described above that some data packets are encapsulated for transmission across the switch 2, while other data packets need not be so encapsulated.

In the header 41, the most significant fifteen bits (making up part of the address field 40*c* in the header 40) have been modified, to create an address field (which replaces part of the address field 40*c*). The address field 41*a* comprises an eight bit address routing field (AF) 41*b*, a single bit control bit field (CF) 41*c*, a six bit virtual function (VF) field 41*d*. A single bit sign field (S) 41*e* is unmodified and indicates the values of the first fifteen most significant bits of the address field 41*a* before modification.

That is, modifying only the fifteen most significant bits allows the server to use addresses of up to forty-eight bits (thereby providing the server with the ability to address up to two-hundred-fifty-six TB of address space). If the server 1 is allowed to use forty-eight bit addresses, the first sixteen bits of the address will be either all 1s or all 0s. As such, by modifying only the first fifteen bits of the address, the sign bit field 41*e* indicates the original (unmodified) value of the first fifteen bits, so that the original unmodified address may be restored as described below. It will, however, be appreciated that the number of bits used for each field of the modified address shown in FIG. 9 is merely exemplary and that fewer or additional bits may be provided for each field as required.

The address routing field 41*b* stores the AF value of the physical device to which the data packet is to be routed (which it will be recalled is assigned by the RPM 8). The control bit field 41*c* stores a single bit, the value of which indicates whether the data packet is an encapsulated data packet and therefore how the data packet should be processed at its destination device. In particular, if the control bit field 41*c* has the value 0, this indicates that the data packet is not an encapsulated data packet and vice versa. The virtual function field 41*d* specifies the virtual function within the server hierarchy. The remaining sixteen bits of the address field 41*a* are unmodified. A requester ID field 41*f* indicates the intercepting device 3 as enumerated by the RPM 8 (i.e. function 0, device 0, BUS2).

It can be seen, therefore, that by way of the modified header 41, a data packet containing an address within a server enumerated hierarchy can be routed to a desired physical device within the physical device hierarchy (i.e. the RPM enumerated hierarchy). Similarly, the server 1 will receive data packets from endpoint devices (such as completion data packets in response to memory read data packets). Upon receiving a data packet containing a modified header and which is to be transmitted to the server 1, modified addresses (specifying a physical device) need be restored to the original address values provided by the server 1. The original address is restored by replacing the modified fifteen bits with the value of the sign field 41*e* (the sixteenth bit of the address field 41*a*). That is, if the sign field 41*e* has a value of 0, bits sixty-three to forty-nine of the address field 41*a* are set to 0, while if the sign field 41*e* has a value of 1, bits sixty-three to forty-nine of the address field 41*a* are set to 1.

The above description with reference to FIG. 9 has described how non-encapsulated packets may be routed in the network hierarchy of FIG. 6. There is now described an example of how data packets which require encapsulation may be processed and routed within the hierarchy of FIG. 6.

Figure 10:
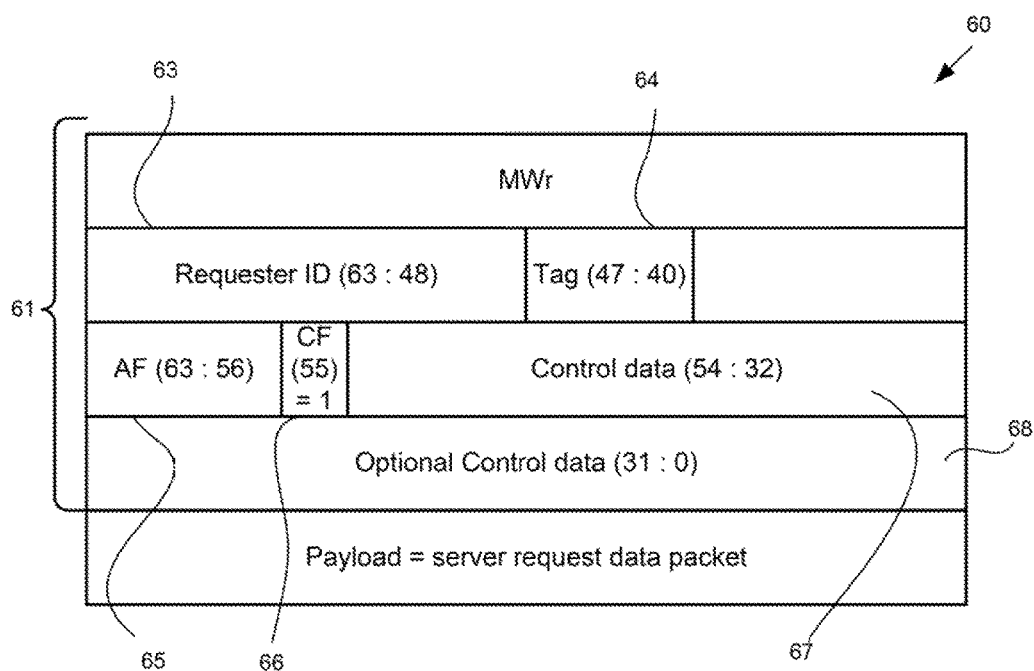

FIG. 10 schematically illustrates a data packet 60 comprising an original data packet encapsulated within a memory write data packet. The data packet 60 comprises a header 61 and a payload 62. The payload 62 is the original data packet encapsulated within the memory write data packet (including the header and payload of the original data packet). For example, the original data packet may be a server configuration data packet directed to one of the virtual endpoint devices 19 to 21. The header 61 comprises a requester ID field 63, and a tag field 64. The header 61 further comprises an address routing field 65, a control bit field 66, and a control data field 67.

The requester ID indicates the device that performs the encapsulation (e.g. the intercepting device 3). The address routing field 65 and the control bit field 64 are as described above with reference to FIG. 9. That is, the address routing field 63 indicates a device in the physical hierarchy to which the data packet 60 is to be sent. The control bit field 66 is set to a value of 1, indicating to a receiving device that the data packet 60 is an encapsulated packet. The control data field 67 replaces the address field of a standard PCIe data packet and provides any additional information required to enable processing of the data packet 60 by the receiving device. It will be appreciated that the nature of the information provided in the control data field 67 is application specific. The optional control data field 68 may be used for the provision of additional control data if required.

Figure 11:
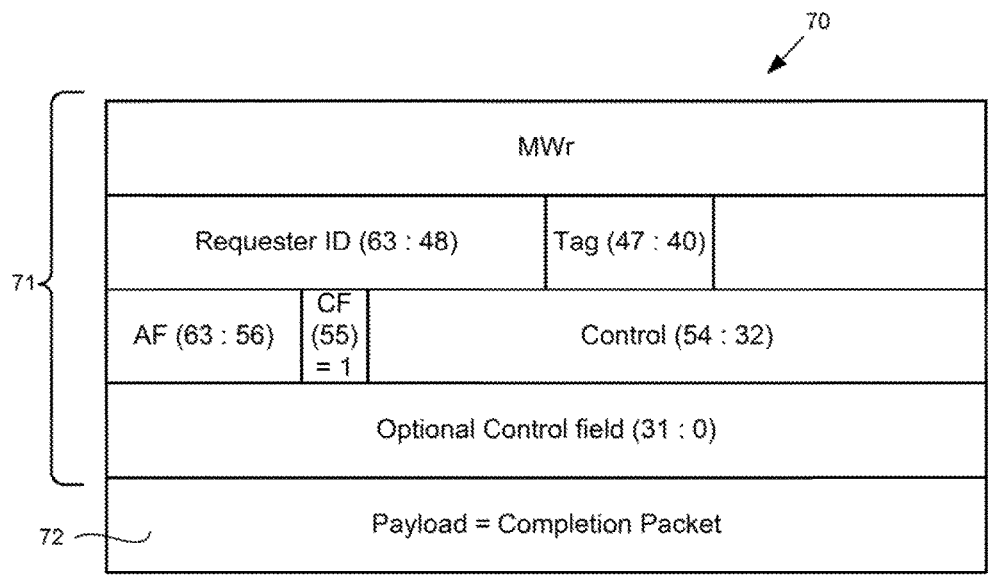

FIG. 11 illustrates a data packet 70 having the same format as the data packet 60. That is, the data packet 70 has a memory write header 71 and a payload 72. In the data packet 70, however, the payload 72 is a completion data packet destined for the server 1, generated for example in response to the data packet 60 (and in particular the payload 62). The data packet 70 may be received by the intercepting device 3 from an endpoint device suitably configured to generate encapsulated data packets. Upon receipt of the data packet 70 at the intercepting device 3, the intercepting device 3 removes the header 71 and forwards the completion packet 72 to the server 1.

Figure 12:
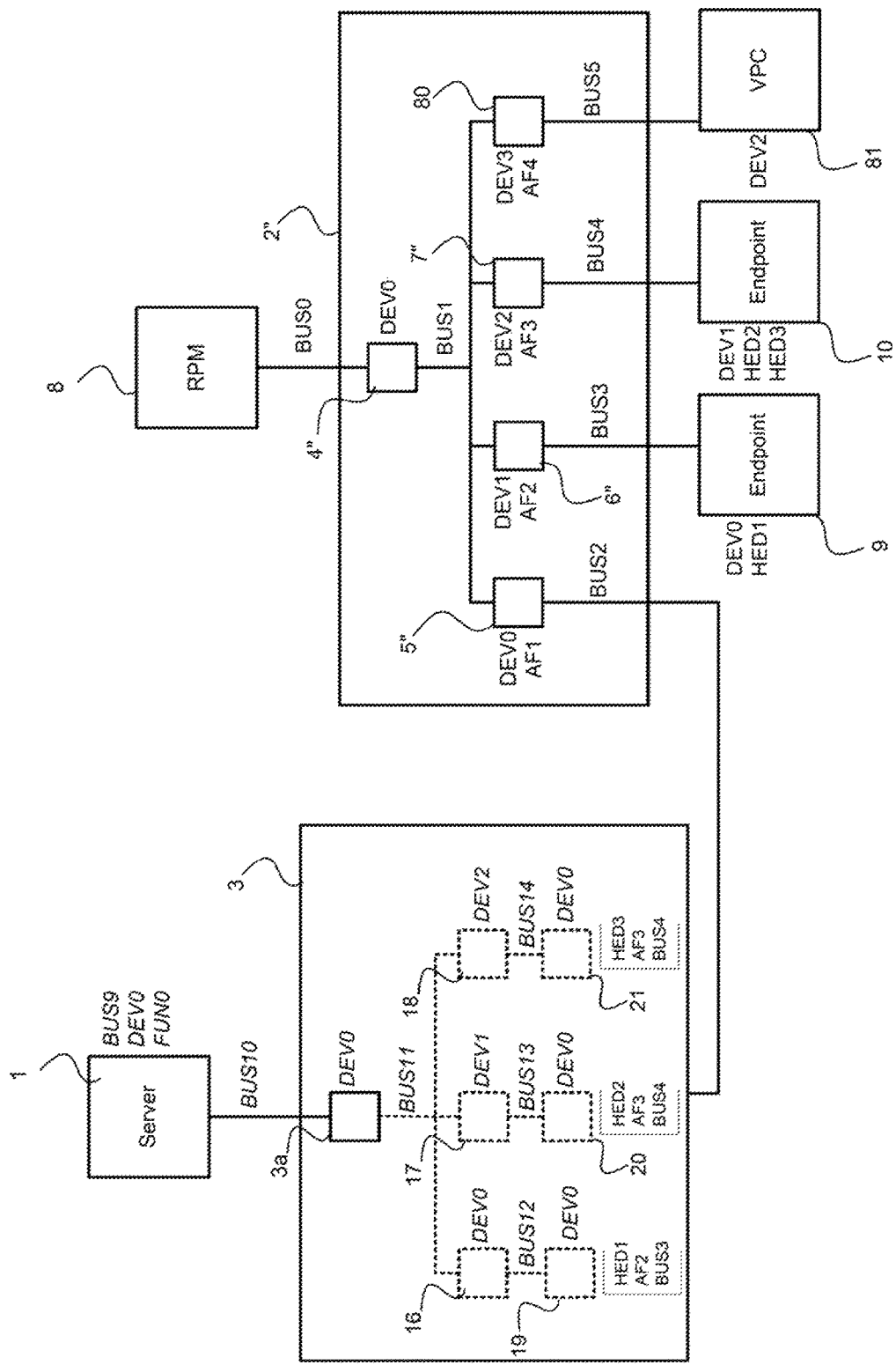
FIG. 12 is a schematic illustration of a network comprising a virtualisation proxy controller.

It is described above that a virtualisation proxy controller device may be used to help facilitate virtualisation in some embodiments. FIG. 12 illustrates a network having substantially the same arrangement as the network of FIG. 6. In contrast to the network of FIG. 6, however, the RPM 8, server 1 (via the intercepting device 3), and endpoints 9, 10 are connected to a switch 2". The switch 2" comprises a single upstream bridge 4" to which are connected four downstream bridges 5", 6", 7" and 80. The server 1 connects to the downstream bridge 5" via the intercepting device 3, the endpoint devices 9, 10 connect to the downstream bridges 6", 7" respectively, and a device 81, referred to as a virtualisation proxy controller (VPC) herein, connects to the downstream bridge 80.

For the purposes of example, the RPM 8 has enumerated the physical network hierarchy of FIG. 12 as follows: the bus connecting the RPM 8 with the bridge 4" is BUS0; the bridge 4" is device 0 on BUS0; the bus connecting the bridge 4" with the bridges 5", 6", 7" and 80 is BUS1; the bridge 5" is device 0 on BUS1 and has an AF value of AF=1; the bridge 6" is device 1 on BUS1 and has an AF value of AF=2; the bridge 7" is device 2 on BUS1 and has an AF value of AF=3; the bridge 80 is device 3 on BUS1 and has an AF value of AF=4; the bus connecting the bridge 5" with the intercepting device 3 is BUS2; the intercepting device 3 is function 0 of device 0 on BUS2; the bus connecting the bridge 6" with the endpoint 9 is BUS3; the endpoint 9 is function 0 of device 0 on BUS3 and provides a virtual device with a HED value of HED1; the bus connecting the bridge 7" with the endpoint device 10 is BUS4; the endpoint device 10 is function 0 of device 0 on BUS4 and provides virtual devices with HED values of HED2 and HED3; the bus connecting the bridge 80 with the VPC 81 is BUS5; and the VPC 81 is function 0 of device 0 on BUS5.

The RPM 8 has configured the intercepting device 3 to present a virtual hierarchy to the server 1 identical to that of the virtual hierarchy shown in FIG. 6. That is, the virtual endpoint device 19 corresponds to the endpoint 9, while the virtual endpoint devices 20, 21 correspond to the endpoint device 10.

Examples of modifications made to data packets belonging to transactions issued by, and received by, the server 1 are now described with reference to the arrangement of FIG. 12 and FIGS. 13 to 15. In the interests of clarity, in the data packets schematically illustrated in FIGS. 13 to 15 only some fields of the data packet are shown.

Figure 13:
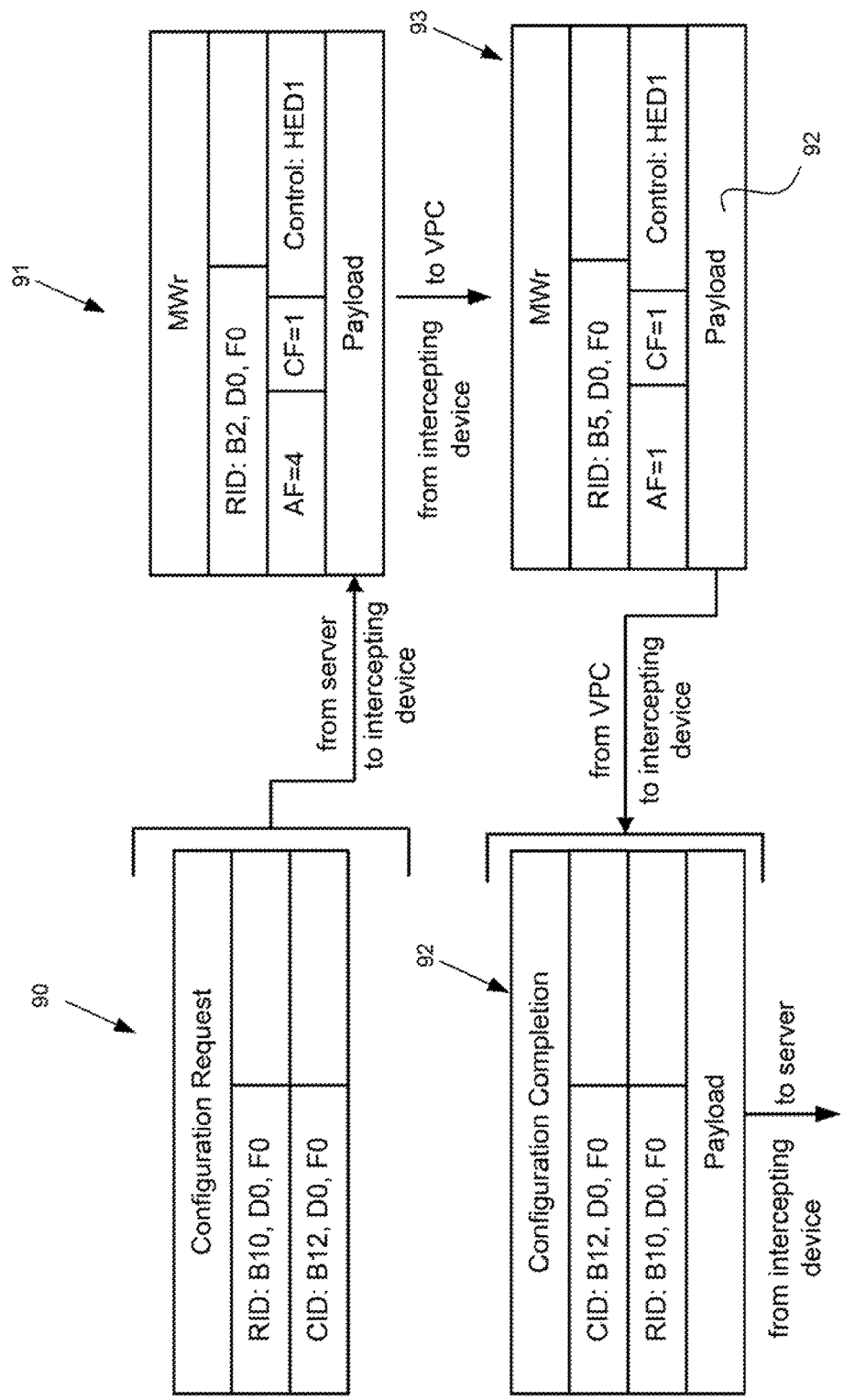
FIGS. 13 to 15 are schematic illustrations showing data packets generated during transactions in some embodiments.

FIG. 13 schematically illustrates a server configuration transaction. A server configuration request data packet 90 is generated by the server 1. The data packet 90 comprises a requester ID field indicating an address upstream of function 0 of device 0 on BUS10 (e.g. the server 1 in the network hierarchy as enumerated by the server 1). The data packet 90 further comprises a completer identifier (indicating the virtual device to which the data packet is destined and from which a completion data packet is expected) indicating function 0 of device 0 on the virtual bus BUS12. The completer identifier therefore indicates the virtual device 19 in the network hierarchy as enumerated by the server 1.

The data packet 90 is received by the intercepting device 3 and processed as described above to determine the virtual endpoint device to which the data packet is destined and the corresponding physical endpoint device, which in this case is the endpoint device 9. The intercepting device 3 determines that the data packet 90 should be transmitted to the VPC 81. The intercepting device 3 therefore encapsulates the data packet 90 within a memory write data packet 91, with the data packet 90 forming the payload of the data packet 91. The data packet 91 has a requester identifier indicating function 0 of device 0 on the bus BUS2 (indicating the intercepting device 3 as enumerated by the RPM 8).

The data packet 91 further comprises an address routing field indicating an AF value of "AF=4" (indicating the VPC 81), a control field value of 1, and control data field comprising a HED value of HED1 indicating the virtual device 19 (which the VPC 81 knows to be provided by the endpoint device 9).

The data packet 91 is sent from the intercepting device 3, through the switch 2" to the VPC 81. Upon receiving the data packet 91, the VPC 81 obtains the data packet 90 and processes the data packet 90 as required. Processing performed by the VPC 81 is described in U.S. patent application Ser. No. 12/430,480, United States Patent Publication No. US2009/0307388, United States Patent Publication No. US 2011-0069710 and United States Patent Publication No. US2010/0146160. Having processed the data packet 90 as required, the VPC 81 generates a completion data packet 92. The completion data packet 92 comprises a completer identifier indicating the function 0 of the device 0 on the bus BUS12 (i.e. the virtual device 19 as enumerated by the server 1) and a requester identifier identifying an address upstream of the function 0 of device 0 on the bus BUS10 (e.g. the server 1 as enumerated by the server 1). As such, to the server 1, the configuration completion data packet 92 appears to have been generated by the virtual device 19 in response to the configuration request data packet 90.

Like the configuration request 90, the configuration completion 92 can not be transmitted upstream to the switch from a downstream device. As such, the VPC 81 encapsulates the data packet 92 within a memory write data packet 93. The data packet 93 comprises a requester identifier indicating the function 0 of device 0 on the bus BUS5 (i.e. indicating the VPC 81 as enumerated by the RPM 8) and comprises an address routing field having a value of "AF=1" (indicating the bridge 5' to which the intercepting device 3 is connected), a control bit field having a value "1" (indicating that it is an encapsulated data packet) and a control data field comprising a HED value of HED1 indicating the virtual endpoint device 19.

Upon receipt of the data packet 93 at the intercepting device 3, the intercepting device 3 removes the memory write header to obtain the configuration completion data packet 92. The configuration completion data packet 92 is then transmitted to the server 1.

Figure 14:
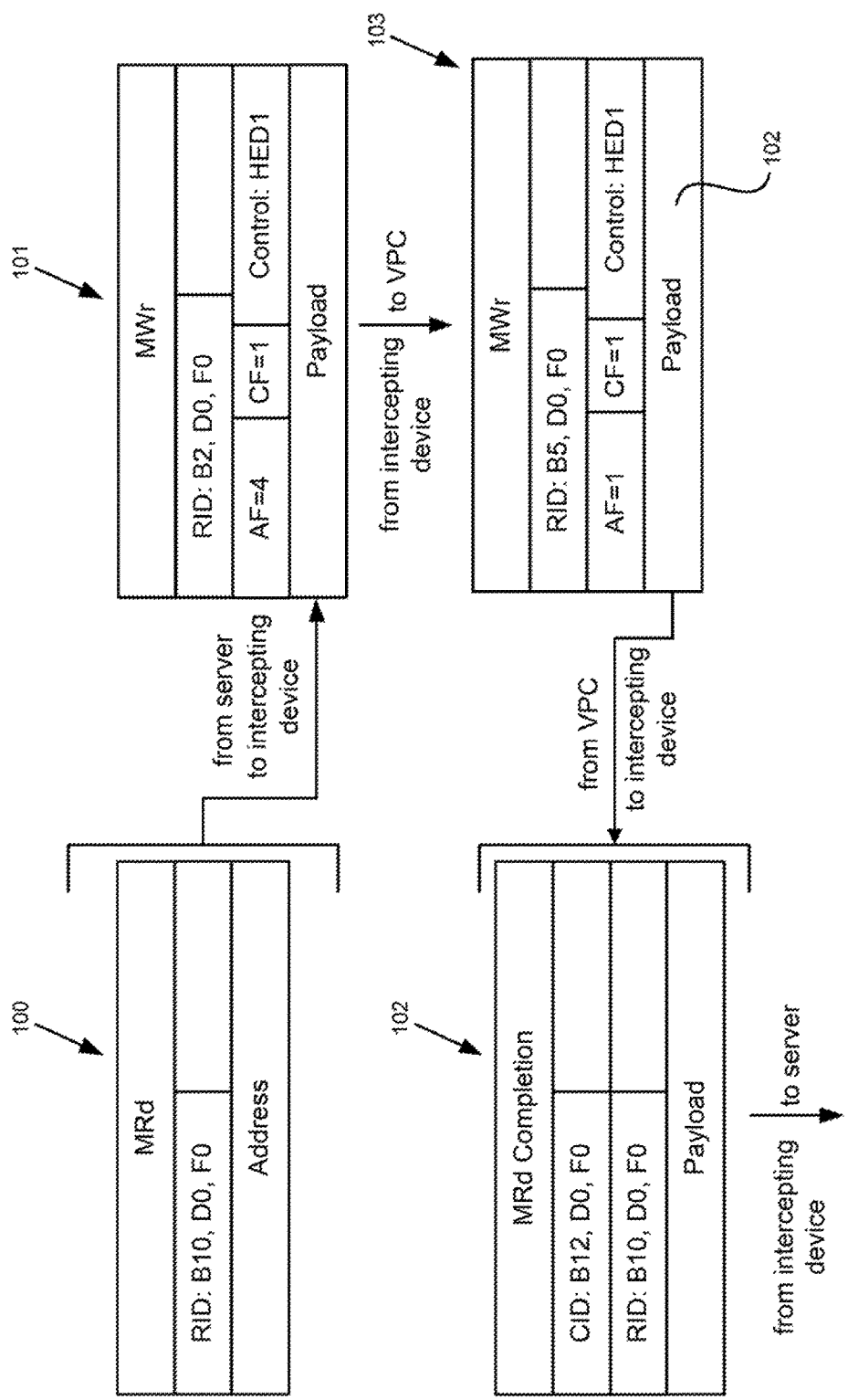

FIG. 14 schematically illustrates a memory read transaction data packet 100 issued by the server 1. The data packet 100 comprises a requester ID field indicating an address upstream of function 0 of device 0 on the bus BUS10 (e.g. the server 1 in the network hierarchy as enumerated by the server 1). The data packet 100 further comprises an address field indicating a memory location within a memory address range of the network as seen by the server 1. The data packet 100 is received at the intercepting device 3 from the server 1 and processed as described above to determine the virtual endpoint device to which the data packet was directed, and the physical endpoint device corresponding to that virtual endpoint device.

The intercepting device 3 determines that the data packet 100 should be transmitted to the VPC 81 for processing. While the data packet 100 is a memory read request (and can therefore be transmitted upstream through the switch 2'), encapsulation of the data packet 100 is performed. Encapsulation is performed in order to more easily keep track of the requester identifier of the original data packet, so that the original requester identifier can be included in the memory read completion data packet that is required to be sent to the server 1.

The intercepting device 3 therefore encapsulates the data packet 100 within a memory write data packet 101, with the data packet 100 forming the payload of the data packet 101. The data packet 101 has a requester identifier indicating function 0 of device 0 on the bus BUS2 (indicating the intercepting device 3 as enumerated by the RPM 8). The data packet 101 further comprises an address routing field indicating an AF value of "AF=4" (indicating the VPC 81), a control field value of 1, and control data field comprising a HED value of HED1 indicating the virtual endpoint device 9 (so that the VPC 81 knows to which of the virtual endpoint devices the data packet 101 relates for the purposes of correctly processing the data packet 101).

The data packet 101 is sent from the intercepting device 3 through the switch 2' to the VPC 81. Upon receipt of the data packet 101, the VPC 81 performs any required processing (such as performing the memory read operation specified in the memory read request data packet 100) and generates a memory read completion data packet 102 that appears to originate from the virtual device 19. The memory read completion data packet 102 is encapsulated within a memory write data packet 103. The data packet 103 comprises a requester identifier indicating the function 0 of device 0 on the bus BUS5 (i.e. indicating the VPC 81 as enumerated by the RPC 81) and comprises an address routing field having a value of "AF=1" (Indicating the bridge 5' to which the intercepting device 3 is connected), a control bit field having a value "1" (indicating that it is an encapsulated data packet) and a control data field comprising a HED value of HED1 indicating the endpoint device 9.

Upon receipt of the data packet 103 at the intercepting device 3, the intercepting device 3 removes the memory write header to obtain the memory read completion data packet 102. The memory read completion data packet 102 is then transmitted to the server 1.

The processing of a memory write transaction issued by the server 1, which is to be forwarded to the VPC 81, proceeds exactly as described above with reference to the memory read transaction of FIG. 14 with the exception that a completion is not required.

Figure 15:
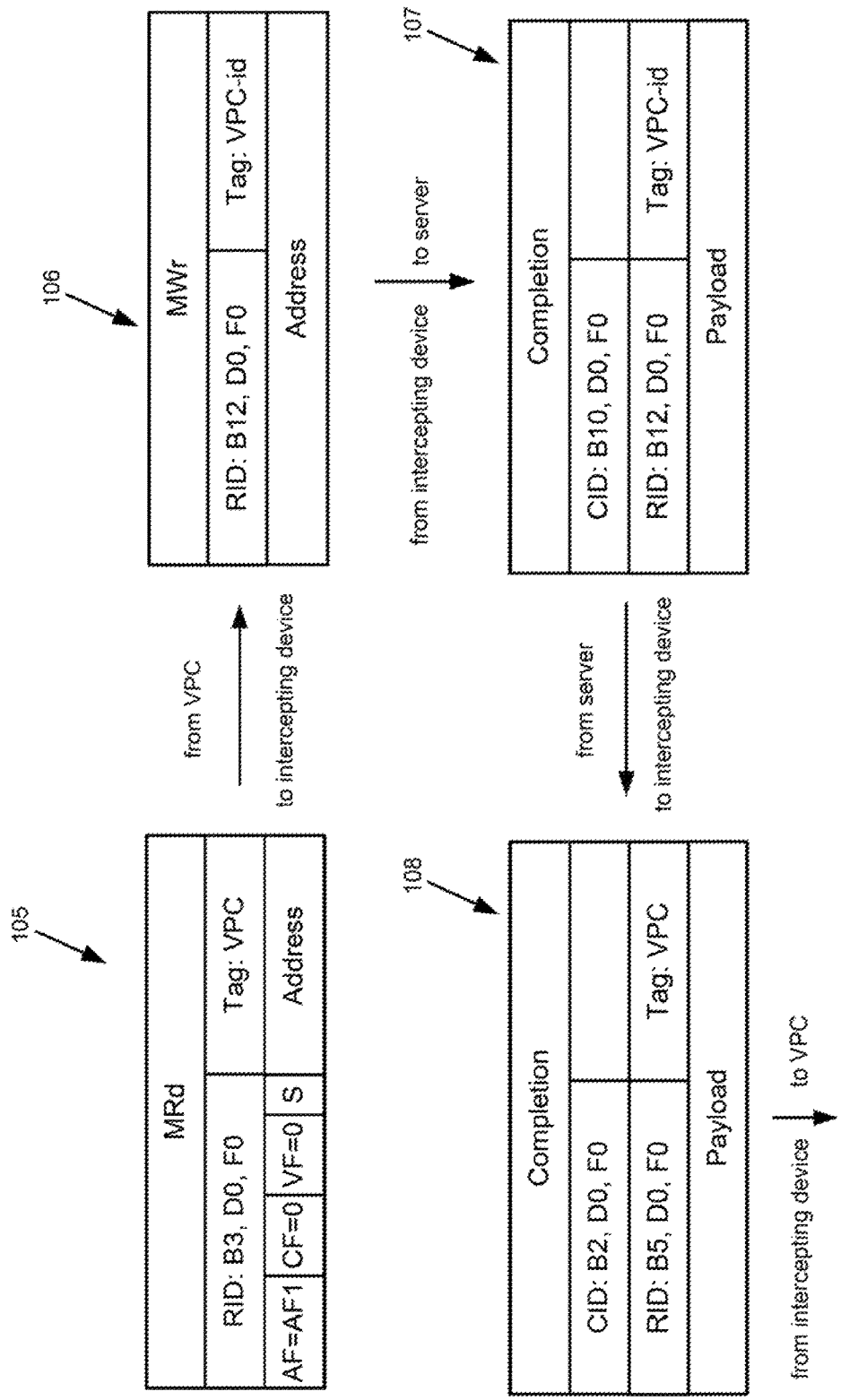
Figure 16:
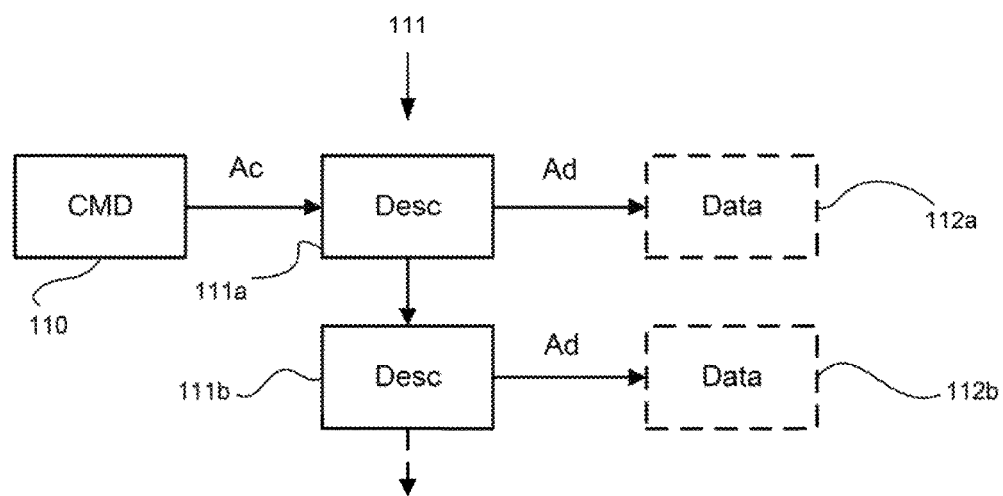
FIG. 16 is a schematic illustration of a command block used for data transfer transactions in some embodiments.

FIG. 15 illustrates a memory read request transaction data packet 105 issued by the VPC 81 on behalf of the endpoint device 9. The data packet 105 comprises a requester identifier indicating the function 0 of the device 0 on the bus BUS3 (i.e. the endpoint device 9 as enumerated by the RPM 8). The data packet 105 further comprises an address routing field with a value AF=1 (indicating the bridge 5' to which the intercepting device 3 is connected), a control field value of "0" indicating that the data packet 105 is not encapsulated, and a virtual function field indicating a virtual function within the virtual hierarchy (as enumerated by the server 1) mapped to the physical function indicated in the requester identifier. In the example of FIG. 15, the virtual function is function 0. Indeed, in the example of FIG. 15, the virtual function can only be function 0 as each of the virtual devices 19 to 21 have been established with only a single virtual function in the arrangement of FIG. 6. It will be appreciated, however, that where multiple virtual functions are configured for a single virtual endpoint device within a virtual hierarchy, that the virtual function field may take other values.

The data packet 105 further comprises a tag field containing an indication that the data packet 105 is generated by the VPC 81. The data packet 105 further comprises a sign bit field (indicating the value to which the address routing field, the control field and the virtual function fields are to be set by the intercepting device before forwarding to the server 1).

The data packet 105 further comprises an address indicating a memory location within the memory of the server 1.

The data packet 105 is transmitted from the VPC 81 to the intercepting device 3. Upon receipt, the intercepting device modifies the data packet 105 to create a data packet 106 by restoring the modified address bits using the value of the sign bit field, as described above, and modifying the requester identifier field to indicate a requester identifier for the virtual device that corresponds to the physical endpoint device 9 (which in this case is the virtual device 19). The data packet 106 therefore comprises a requester identifier field indicating the function 0 of device 0 on the bus BUS12. The data packet 106 also comprises a tag value indicating the VPC 81. The tag value of the data packet 106 (i.e. the tag value used by the intercepting device to refer to the VPC 81) may not be the same as the tag value of the data packet 105 (i.e. the tag value used by the VPC 81 to refer to itself) provided the intercepting device 3 maintains a mapping between the two tag values. This is illustrated in FIG. 15 by the tag value of the data packet 106 having a value "VPC-id". This may be useful where the VPC 81 and the intercepting device 3 utilise different bits of the tag field for the identifier indicating the VPC 81.

The data packet 106 is transmitted from the intercepting device 3 to the server 1. The server 1 processes the data packet 106 in the normal way and generates a completion data packet 107. The data packet 107 comprises a completer identifier indicating an address upstream of function 0 of device 0 of the bus BUS10 (e.g. the server 1), and a requester identifier indicating the function 0 of device 0 on the bus BUS12 (i.e. the virtual device 19 as enumerated by the server 1). The completion data packet 107 further comprises the same tag field as the data packet 106.

The completion data packet 107 is transmitted from the server 1 and received by the intercepting device 3, which modifies the data packet 107 to create a completion data packet 108. The completion data packet 108 comprises a completer identifier indicating the intercepting device 3 as enumerated by the RPM 8 (i.e. function 0 of device 0 on the bus BUS2) and a requester identifier indicating the VPC 81 (rather than the endpoint device 9). If the tag values used by the intercepting device 3 and the VPC 81 are different, as described above, the intercepting device replaces the tag value of the data packet 107 with that used by the VPC 81 in the data packet 105. The data packet 108 is transmitted from the intercepting device 3 to the VPC 81.

A memory read or memory write transaction issued by an endpoint device 9, 10 will proceed in the same way as described above with respect to those issued by the VPC 81 except that the tag fields will indicate the issuing endpoint device.

Bulk data transfers between servers and endpoint devices form the majority of data traffic over a PCIe network. Once the data transfer has been set-up, the data transfers are routed directly between the server and the endpoint device and do not require encapsulation. An example data transfer is now described with reference to the arrangement of FIG. 12, and to FIGS. 16 and 17. Generally, with reference to FIG. 16, to perform a data transfer from a server to an endpoint device (i.e. a data write from server memory to an endpoint device) a server generates a command block I/O comprising at a location in the memory of the server. The command block I/O comprises an address (Ac) of a "descriptor ring" 111 comprising descriptors 111a, 111b etc. Each descriptor 111a, 111b in the descriptor ring 111 comprises an individual address (Ad) of a respective data buffer 112a, 112b within the memory of the server at which the data to be transferred to the endpoint device is stored.

Figure 17:
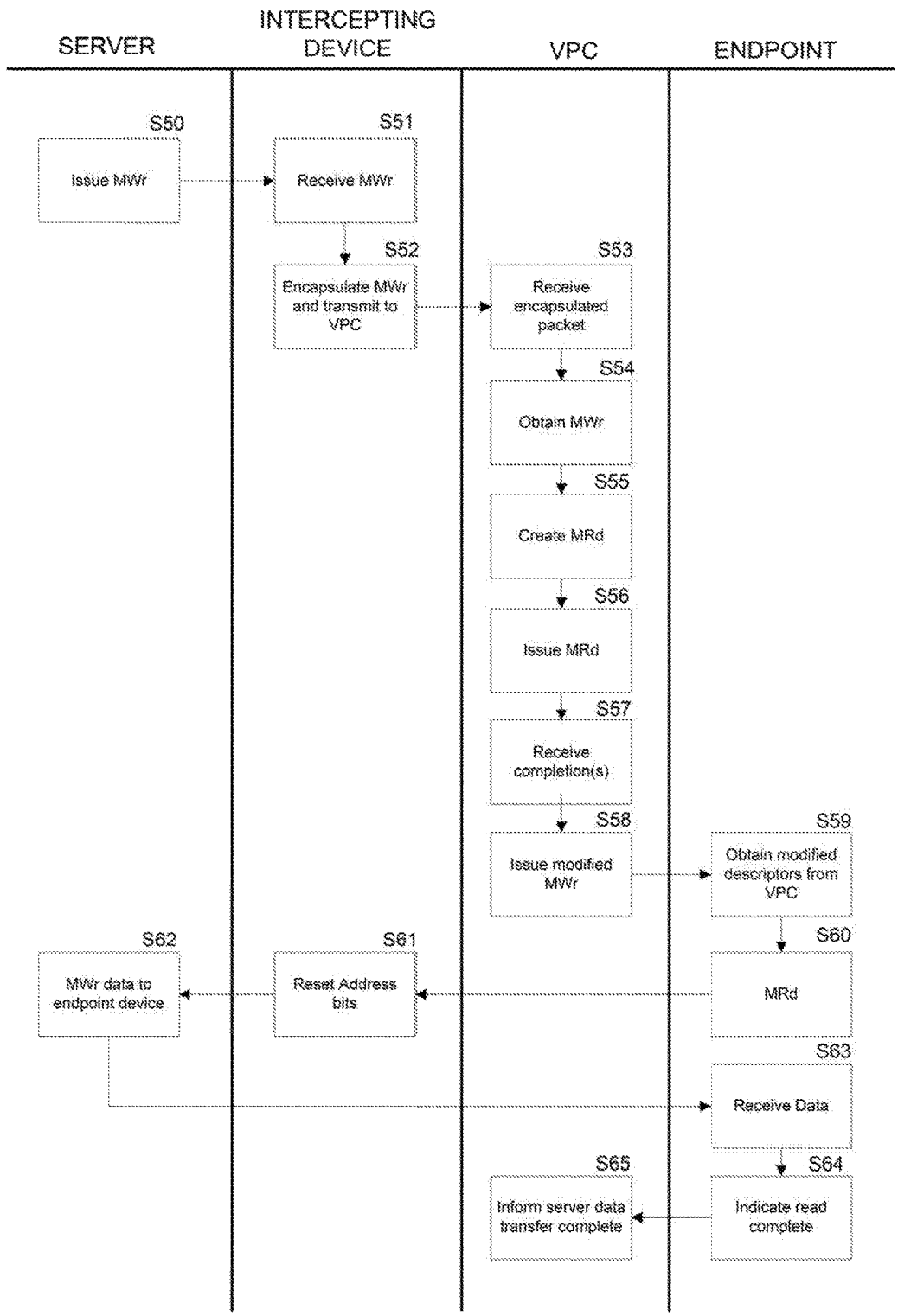
FIG. 17 is a flowchart showing processing carried out by components of the network of FIG. 12 during a data transfer transaction in accordance with some embodiments.

FIG. 17 is a flowchart showing processing carried out by devices in the arrangement of FIG. 12 to carry out a data transfer from the server 1 and the endpoint device 9.

At step S50 the server 1 creates a command block (like that shown in FIG. 16) and issues a memory write data packet. As described above, the memory write data packet comprises an address field containing the Ac address of the command block. The server 1 transmits the memory write data packet. Processing passes from step S50 to step S51, at which the memory write data packet is received at the intercepting device 3. At step S52, as described above with reference to FIG. 14, the intercepting device determines the virtual endpoint device (virtual endpoint device 19) to which the data packet is addressed, determines the corresponding physical endpoint device (the endpoint device 19) and encapsulates the memory write data packet within a memory write data packet for transmission to the VPC 81. The encapsulated memory write data packet comprises a requester identifier indicating the intercepting device 3 (i.e. function 0 of device 0 on bus BUS2), an address routing field with a value "AF=4", a control field with a value "1" and control data comprising a HED value "HED1". The encapsulated data packet is transmitted to the VPC 81.

Processing passes from step S52 to step S53, at which the VPC 81 receives the encapsulated packet. At step S54 the VPC 81 processes the encapsulated packet. In particular, the VPC 81 determines that the control field has a value of "1" and extracts the original memory write packet issued by the server 1. At step S55, the VPC 81 prepares to read the descriptors addressed in the original memory write data packet by generating a corresponding memory read data packet. The memory read data packet is as shown in FIG. 15. In particular, the memory read data packet generated at step S55 comprises a requester identifier indicating the endpoint device 9 (function 0 of device 0 on bus BUS3), and an address field comprising the forty-nine least significant bits of the sixty-four bit Ac address contained within the memory write data packet issued by the server at step S50. It will be appreciated that the forty-ninth least significant bit comprises the sign bit field. The sixteen most significant bits are modified as described above. In particular, an address routing field indicates the intercepting device 3 (AF=1), the control field has a value of "0", and the virtual function field has a value of "0". The tag field indicates the VPC 81. The memory read request data packet is transmitted at step S56.

At step S57 the VPC 81 receives completion data packets from the intercepting device in response to the memory read request, the completion data packets containing the values of the descriptors addressed by the command block (i.e. the Ad address(es)). At step S58 the VPC 81 creates a modified command block in which the Ac address is modified to include address routing fields indicating "AF=4" (i.e. the VPC 81), control fields having a value of "0" (indicating they are not encapsulated data packets) and virtual function fields of "0" (indicating the virtual function with which the server 1 believes it is interacting). The Ad addresses are similarly modified but with address routing fields indicating "AF=1" (i.e. the intercepting device 3). The VPC 81 then writes the command block to a memory location within the endpoint device 9 using a memory write transaction.

At step S59 the endpoint device 9 reads the modified descriptors from the VPC 81 using a memory read transaction (the data packets of which comprise the modified Ac address having the "AF4" value), and receives memory read completions from the VPC 81. At step S60, the endpoint device 9 fetches the data addressed by the descriptors it has obtained from the VPC 81 using a memory read data packet(s) in which the address field comprises the modified Ad addresses having an address routing value of "AF=1". At step S61 the intercepting device receives the memory read data packet, restores the modified Ad address bits using the sign bit as described above, and transmits the memory read data packet to the server 1. At step S62, the server sends the data to the endpoint device using completion packets as described above. For clarity and conciseness the completion transfers containing the data are not described in detail herein, but proceed as described above with reference to FIG. 15 (but with a tag field indicating the endpoint device 9).

The data is received at the endpoint device 9 at step S63. When the final data buffer has been transferred from the server 1 to the endpoint device 9, the endpoint device 9 indicates to the VPC 81 that the transfer is complete at step S64. For example, depending upon implementation of the endpoint device 9, data may be written to a specified address in the VPC 81 or the descriptors may be returned to the VPC 81. At step S65, the VPC 81 informs the server 1 that the data transfer is complete, by, for example, updating a return pointer in the memory of the server 1 (using a modified MWr as described above), or alternatively, returning the descriptors (with restored Ad addresses) depending upon the required protocol.

From the above description, it can be seen that embodiments allow data packets to be routed through a standard switch (i.e. a switch which has not been modified to explicitly permit the transmission of control data packets upstream) between devices (such as servers, endpoint devices (e.g. I/O endpoint devices) and virtualisation proxy controllers) that are each connected to downstream ports of the switch.

While in the examples described above only a single switch is described, it will be readily apparent from the teaching herein that multiple switches may be connected. For example, in the arrangement of FIG. 1 a further switch may be connected to a further downstream port (not shown) of the switch 2. In this case, the software operating on the RPM 8 would enumerate the physical bridges of, and devices connected to, the further switch in the manner described above with reference to FIG. 5.

The preceding description has described embodiments in which data packets are transmitted between a server and endpoint devices such as I/O endpoint devices or virtualisation proxy controllers. It will be appreciated that the term server is intended broadly and is intended to cover any computing device. Similarly, the term virtualisation proxy controller is intended broadly to cover any device suitable for carrying out the processing described herein and/or in any one of U.S. patent application Ser. No. 12/430,480, United States Patent Publication No. US2009/0307388, United States Patent Publication No. US 2011-0069710 and United States Patent Publication No. US2010/0146160. As is described elsewhere, both the intercepting device and the virtualisation proxy controller may be implemented in any convenient way, such as, for example, a suitably programmed FPGA or ASIC.

CONCLUSION

In conclusion, there are now described a number of possible aspects.

According to a first aspect, there is provided a method for transmitting data packets from a first device through a switch to a second device. The method comprises at an intercepting device intermediate the first device and the switch device: receiving a first data packet from the first device; determining that the first data packet is to be transmitted to the second device; and determining whether the first data packet is of a first type that can not be transmitted from the intercepting device to the second device through the switch. If it is determined that the first data packet is of the first type, the method comprises: encapsulating the first data packet within a second data packet, the second data packet being of a second type that can be transmitted from the intercepting device through the switch to the second device and transmitting the second data packet through the switch to the second device. If it is determined that the first data packet is not of the first type, the method comprises transmitting the first data packet through the switch to the second device.

In this way, the first aspect allows data packets to be transmitted from the first device to the second device even where those data packets are of a type that may not normally be transmitted through the switch from the first device or the intercepting device. For example, where the switch is a PCIe switch, and the first device (via the intercepting device) is connected to the switch at a downstream port, some data packets cannot be transmitted from the first device (or the intercepting device) through a downstream port (i.e. upstream through the switch). The first aspect overcomes this problem.

The switch may be a PCIe switch. The first type may be a configuration transaction. The second type may be a data transaction.

The first data packet may comprise an address field. The address field may comprise an indication of a first virtual device.

Determining that the first data packet is to be transmitted to the second device may comprise determining that the second device is associated with the first virtual device.

The second device may provide resources that appear to the first device to be provided by the first virtual device.

The second device may be a proxy device that is to receive the first or second data packet on behalf of a fourth device, the fourth device providing resources that appear to the first device to be provided by the first virtual device.

The method may further comprise, at the intercepting device: receiving a third data packet from the switch and determining whether the third data packet is an encapsulated data packet. If it is determined that the third data packet is an encapsulated data packet, the method may further comprise de-encapsulating the third data packet to obtain a fourth data packet and transmitting the fourth data packet to the first device. If it is determined that the third data packet is not an encapsulated data packet, the method may further comprise transmitting the third data packet to the first device.

The third data packet may be of the second type. The fourth data packet may be of the first type.

The method may further comprise, at the intercepting device: receiving data indicating a virtual device hierarchy comprising a first virtual endpoint device, wherein at least some data packets directed to the first virtual endpoint device are to be transmitted to the second device.

The method may further comprise, at the intercepting device: receiving enumeration data packets from the first device, and responding to the enumeration data packets based on the data indicating a virtual device hierarchy.

The data indicating a virtual device hierarchy may comprise data indicating a physical device hierarchy. The physical device hierarchy may comprise at least one physical device, the at least one physical device providing resources that appear to the first device to be provided by the at least one virtual device.

The method may further comprise, storing at the intercepting device data associating the at least one virtual device with the at least one physical device.

If it is determined that the first data packet is not of the first type, the method may further comprise modifying an address field of the first data packet before the first data packet is transmitted to the second device through the switch. The address field may comprises a first portion and a second portion, wherein bits in the first portion indicate a virtual endpoint device and bits in the second portion each have the same value. Modifying an address field may comprise modifying some bits in the second portion to indicate a physical device associated with the virtual endpoint device while leaving at least one predetermined bit in the second portion unmodified.

In this way, the modified bits in the second portion may be easily and efficiently restored based on the at least one unmodified bit.

Receiving data indicating a virtual device hierarchy may comprise receiving data from a fifth device, the fifth device being connected to an upstream port of the switch.

The first device and the second device may be connected to respective downstream ports of the switch.

According to a second aspect, there is provided a method of transmitting data packets, comprising at an intercepting device intermediate a first device and a switch: receiving a first data packet from the switch, the first data packet originating at a second device and determining whether the first data packet is an encapsulated data packet. If it is determined that the first data packet is an encapsulated data packet, the method may comprise de-encapsulating the first data packet to obtain a second data packet and transmitting the second data packet to the first device. If it is determined that the first data packet is not an encapsulated data packet, the method may comprise transmitting the first data packet to the first device.

The method may further comprise, receiving at the intercepting device a third data packet from the first device, determining that the third data packet is to be transmitted to the second device and determining whether the third data packet is of a first type that can not be transmitted from the intercepting device to the second device through the switch. If it is determined that the third data packet is of the first type, the method may comprise encapsulating the third data packet within a fourth data packet, the fourth data packet being of a second type that can be transmitted from the intercepting device through the switch to the second device and transmitting the fourth data packet to the second device through the switch. If it is determined that the third data packet is not of the first type, the method may comprise transmitting the third data packet through the switch to the second device.

According to a third aspect, there is provided a method of transmitting data packets through a switch to a first device from a second device, comprising at the second device: creating a first data packet for transmission to the first device through the switch; determining that the first data packet is of a first type that can not be transmitted from the second device to the first device through the switch; encapsulating the first data packet within a second data packet, the second data packet being of a second type that can be transmitted from the second device to the first device through the switch.

The switch may be a PCIe switch. The first type may be a configuration transaction type and the second type may be a data transaction type.

The first and second devices may be connected to respective downstream ports of the switch.

According to a fourth aspect, there is provided a device for connection between a first device and a switch, comprising: a receiver for receiving data packets; a transmitter for transmitting data packets; a memory storing computer readable instructions; and a processor for executing the computer readable instructions. The computer readable instructions are configured to cause the device to: receive a first data packet from the first device; determine that the first data packet is to be transmitted to a second device and determine whether the first data packet is of a first type that can not be transmitted through the switch from the device to the second device. The computer readable instructions are further configured to, if it is determined that the first data packet is of the first type: encapsulate the first data packet within a second data packet, the second data packet being of a second type that can be transmitted from the device through the switch to the second device and transmit the second data packet through the switch to the second device. If it is determined that the first data packet is not of the first type: transmit the first data packet through the switch to the second device.

According to a fifth aspect, there is provided a device for connection between a first device and a switch, comprising: a receiver for receiving data packets; a transmitter for transmitting data packets; a memory storing computer readable instructions; and a processor for executing the computer readable instructions. The computer readable instructions are configured to cause device to: receive a first data packet from the switch; determine whether the first data packet is an encapsulated data packet and if it is determined that the first data packet is an encapsulated data packet: de-encapsulate the first data packet to obtain a second data packet and transmit the second data packet to the first device; while if it is determined that the first data packet is not an encapsulated data packet, transmit the first data packet to the first device.

According to a sixth aspect, there is provided a proxy device comprising: a transmitter for transmitting data packets; a memory storing computer readable instructions; a processor for executing the computer readable instructions. The computer readable instructions are configured to cause the proxy device to: create a first data packet for transmission to a first device through a switch; determine that the first data packet is of a first type that can not be transmitted to the first device through the switch; encapsulate the first data packet within a second data packet, wherein the second data packet is of a second type that can be transmitted to the first device through a switch; and transmit the second data packet to the first device through the switch.

According to a seventh aspect, there is provided a system comprising: a first device configured to generate a first data packet; a switch; a second device connected to the switch; an intercepting device intermediate the first device and the switch, the intercepting device being configured to: receive the first data packet from the first device; determine that the first data packet is to be transmitted to the second device; and determine whether the first data packet is of a first type that can not be transmitted through the switch from the intercepting device to the second device. The intercepting device is configured to, if it is determined that the first data packet is of the first type, encapsulate the first data packet within a second data packet, the second data packet being of a second type that can be transmitted from the intercepting device through the switch to the second device and transmit the second data packet through the switch to the second device, while if it is determined that the first data packet is not of the first type, transmit the first data packet through the switch to the second device.

The switch may be a PCIe switch. The first type may be a configuration transaction type and the second type may be a data transaction type.

The system may further comprise a fourth device connected to the switch. The second device may be a proxy device configured to receive the first or second data packet on behalf of the fourth device, the fourth device being configured to provide resources that appear to the first device to be provided by a virtual device.

According to an eighth aspect, there is provided a system comprising: a switch; a first device connected to a first downstream port of the switch via an intercepting device; a second device connected to a second downstream port of the switch; wherein the first device is configured to generate data packets to be transmitted to the second device through the switch.

The intercepting device may be configured to: receive a first data packet from the first device; determine that the first data packet is to be transmitted to the second device; and determine whether the first data packet is of a first type that can not be transmitted through the switch from the intercepting device to the second device. The intercepting device may also be configured to, if it is determined that the first data packet is of the first type, encapsulate the first data packet within a second data packet, the second data packet being of a second type that can be transmitted from the intercepting device through the switch to the second device and to transmit the second data packet through the switch to the second device, while if it is determined that the first data packet is not of the first type, to transmit the first data packet through the switch to the second device.

According to a ninth aspect, there is provided a method of providing identifiers for virtual devices in a network, the method comprising: receiving an enumeration data packet; responding to the enumeration data packet with a response comprising an identifier of a first virtual endpoint device; receiving a further enumeration data packet; and responding to the further enumeration data packet with a response comprising an identifier of a second virtual endpoint device; wherein functionality of the first virtual endpoint device and the second endpoint virtual device is provided by a single physical endpoint device.

In this way, the ninth aspect advantageously enables a plurality of virtual devices to be provided to an enumerating device, where the functionality of the plurality of virtual devices is provided by a single physical device.

The method may further comprise receiving data indicating a virtual device hierarchy comprising the first and second virtual endpoint devices and an indication that a data packet directed to either the first or second virtual endpoint device are to be transmitted to the single physical endpoint device.

It will be appreciated that aspects can be implemented in any convenient way including by way of suitable hardware and/or software. For example, devices arranged to implement embodiments may be created using appropriate hardware components. Alternatively, a programmable device may be programmed to implement embodiments. The invention therefore also provides suitable computer programs for implementing aspects. Such computer programs can be carried on suitable carrier media including tangible carrier media (e.g. hard disks, CD ROMs and so on) and intangible carrier media such as communications signals.

One or more aspects described herein, may be combined with any one or more other aspects described herein, and/or with any one or more features described herein.

Further modifications and applications of the present invention will be readily apparent to the appropriately skilled person from the teaching herein, without departing from the scope of the appended claims.

The invention claimed is:

1. A method, comprising:
   receiving at an intermediate device, from a source device, a first data packet for transmission to a destination device, wherein the intermediate device and the destination device are connected to downstream ports of a switch;
   determining at the intermediate device that the first data packet is of a disallowed transaction type that cannot be transmitted in an upstream direction from the intermediate device to the destination device through the switch;
   generating at the intermediate device a second data packet of an allowed transaction type, the second data packet comprising the first data packet; and
   transmitting from the intermediate device the second data packet to the destination device through the switch.

2. The method of claim 1, wherein the switch is a PCIe switch, the disallowed transaction type is a configuration transaction and the allowed transaction type is a data transaction.

3. The method of claim 1, wherein the first data packet comprises an address field, and wherein the address field comprises an indication of a first virtual device.

4. The method of claim 3, further comprising:
   determining at the intermediate device that the destination device is associated with the first virtual device.

5. The method of claim 3, wherein the destination device provides resources that appear to the source device to be provided by the first virtual device.

6. The method of claim 3, wherein the destination device is a proxy device that is to receive the first or second data packet on behalf of a fourth device, the fourth device providing resources that appear to the source device to be provided by the first virtual device.

7. The method of claim 1, further comprising, at the intermediate device:
   receiving a third data packet from the switch, the third data packet comprising a fourth data packet for transmission to the source device;
   transmitting the fourth data packet to the source device and not the third data packet,
   wherein the third data packet of is an allowed transaction type and the fourth data packet is of a disallowed transaction type.

8. The method of claim 1, further comprising, at the intermediate device:
   receiving data indicating a virtual device hierarchy comprising a first virtual endpoint device, wherein at least some data packets directed to the first virtual endpoint device are to be transmitted to the destination device;
   receiving enumeration data packets from the source device; and
   responding to the enumeration data packets based on the data indicating a virtual device hierarchy.

9. The method of claim 8, wherein the data indicating a virtual device hierarchy further comprises data indicating a physical device hierarchy comprising at least one physical device, the at least one physical device providing resources that appear to the source device to be provided by the at least one virtual device; and
   storing data associating the at least one virtual device with the at least one physical device.

10. The method of claim 8, further comprising:
    receiving at the intermediate device, from the source device, a fifth data packet for transmission to the destination device;
    determining that the fifth data packet is of an allowed transaction type;
    modifying an address field of the fifth data packet;
    wherein the address field comprises a first portion and a second portion, wherein bits in the first portion indicate a virtual endpoint device and bits in the second portion each have the same value; and
    wherein modifying an address field comprises modifying some bits in the second portion to indicate a physical device associated with the virtual endpoint device while leaving at least one predetermined bit in the second portion unmodified; and
    transmitting the fifth data packet to the destination device through the switch.

11. The method of claim 8, wherein receiving data indicating a virtual device hierarchy comprises receiving data from a fifth device, the fifth device being connected to an upstream port of the switch.

12. The method of claim 1, wherein the source device and the destination device are connected to respective downstream ports of the switch.

13. An intermediate device between a source device and a switch, the intermediate device connected to a downstream port of the switch, comprising:
    a receiver for receiving data packets;
    a transmitter for transmitting data packets;
    a memory storing computer readable instructions; and
    a processor for executing the computer readable instructions;
    wherein the computer readable instructions are configured to cause the device to:
      receive, from the source device, a first data packet for transmission to a destination device, wherein the destination device is connected to a further downstream port of the switch,
      determine that the first data packet is of a disallowed transaction type that cannot be transmitted from the intermediate device to the destination device in an upstream direction through the switch,
      generate a second data packet of an allowed transaction type, the second data packet comprising the first data packet; and
      transmit the second data packet to the destination device through the switch.

14. A system comprising:
    a source device;
    a switch;
    an intermediate device between the source device and the switch, the intermediate device connected to a downstream port of the switch;
    a destination device connected to a further downstream port of the switch;
    the intermediate device being configured to:
      receive, from the source device, a first data packet for transmission to a destination device;
      determine that the first data packet is of a disallowed transaction type that cannot be transmitted from the intermediate device to the destination device in an upstream direction through the switch;

generate a second data packet of an allowed transaction type, the second data packet comprising the first data packet; and transmit the second data packet to the destination device through the switch.

15. The system of claim 14, wherein the switch is a PCIe switch, the disallowed transaction type is a configuration transaction and the allowed transaction type is a data transaction.

16. The system of claim 15, further comprising a fourth device connected to the switch, wherein the destination device is a proxy device configured to receive the first or second data packet on behalf of the fourth device, the fourth device being configured to provide resources that appear to the source device to be provided by a virtual device.

* * * * *